United States Patent
Nudejima et al.

(10) Patent No.: US 10,977,763 B2
(45) Date of Patent: Apr. 13, 2021

(54) INFORMATION PROCESSING DEVICE AND IMAGE PROCESSING SYSTEM

(71) Applicant: FUJI XEROX CO., LTD., Tokyo (JP)

(72) Inventors: Masaki Nudejima, Yokohama (JP); Tomoyuki Ono, Yokohama (JP); Takayuki Hashimoto, Yokohama (JP); Suguru Oue, Yokohama (JP); Daiki Takazawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 43 days.

(21) Appl. No.: 16/014,451

(22) Filed: Jun. 21, 2018

(65) Prior Publication Data

US 2019/0130523 A1 May 2, 2019

(30) Foreign Application Priority Data

Oct. 31, 2017 (JP) .............................. JP2017-210521

(51) Int. Cl.
| | |
|---|---|
| *G06T 1/60* | (2006.01) |
| *G06F 3/12* | (2006.01) |
| *G06T 1/20* | (2006.01) |
| *G06K 15/02* | (2006.01) |

(52) U.S. Cl.
CPC .............. *G06T 1/60* (2013.01); *G06F 3/1215* (2013.01); *G06T 1/20* (2013.01)

(58) Field of Classification Search
CPC .......... G06T 1/60; G06T 1/20; G06F 3/1215; G06K 15/1857
See application file for complete search history.

(56) References Cited

U.S. PATENT DOCUMENTS

| | | | | |
|---|---|---|---|---|
| 4,403,286 | A * | 9/1983 | Fry | G06F 9/505 710/15 |
| 5,930,410 | A * | 7/1999 | Webb | H04N 1/6011 382/312 |
| 7,161,506 | B2 * | 1/2007 | Fallon | G06T 9/00 341/51 |
| 8,498,000 | B1 * | 7/2013 | Komazawa | G06F 3/1215 358/1.13 |
| 8,773,684 | B2 * | 7/2014 | Hirota | G03G 15/5012 271/265.02 |
| 2002/0011995 | A1 * | 1/2002 | Sasaki | G09G 5/06 345/204 |

(Continued)

FOREIGN PATENT DOCUMENTS

| | | |
|---|---|---|
| JP | 2008-098915 A | 4/2008 |
| JP | 2012-098884 A | 5/2012 |

*Primary Examiner* — Idriss N Alrobaye
*Assistant Examiner* — Henry W Yu
(74) *Attorney, Agent, or Firm* — Oliff PLC

(57) ABSTRACT

An information processing device includes: a first processing unit that processes plural color signals at a time and outputs a processed plural color signals in parallel; a memory that temporarily stores the processed plural color signals outputted in parallel from the first processing unit; and a second processing unit that reads the processed plural color signals from the memory in order by a processable number at a time, the second processing unit being able to process a smaller number of color signals than the first processing unit at a time, wherein a reading speed from the memory is faster than a writing speed to the memory.

13 Claims, 19 Drawing Sheets

(56) References Cited

U.S. PATENT DOCUMENTS

| | | | | |
|---|---|---|---|---|
| 2005/0168473 | A1* | 8/2005 | Nishi | G06T 1/60 345/562 |
| 2007/0195355 | A1* | 8/2007 | Banton | H04N 1/32529 358/1.15 |
| 2008/0126621 | A1* | 5/2008 | Huang | G06T 1/60 710/52 |
| 2010/0321394 | A1* | 12/2010 | Shinomiya | G06T 1/20 345/501 |
| 2011/0010472 | A1* | 1/2011 | Kang | G06T 1/20 710/24 |
| 2011/0050918 | A1* | 3/2011 | Tachi | H04N 5/217 348/208.4 |
| 2012/0110283 | A1* | 5/2012 | Nakazono | G06T 1/20 711/154 |
| 2012/0151190 | A1* | 6/2012 | Usuba | G06F 9/4843 712/220 |
| 2014/0169479 | A1* | 6/2014 | Oga | H04N 19/91 375/240.18 |
| 2015/0178881 | A1* | 6/2015 | Qian | G06K 15/1857 345/505 |
| 2018/0300074 | A1* | 10/2018 | Appu | G06F 3/0625 |

* cited by examiner

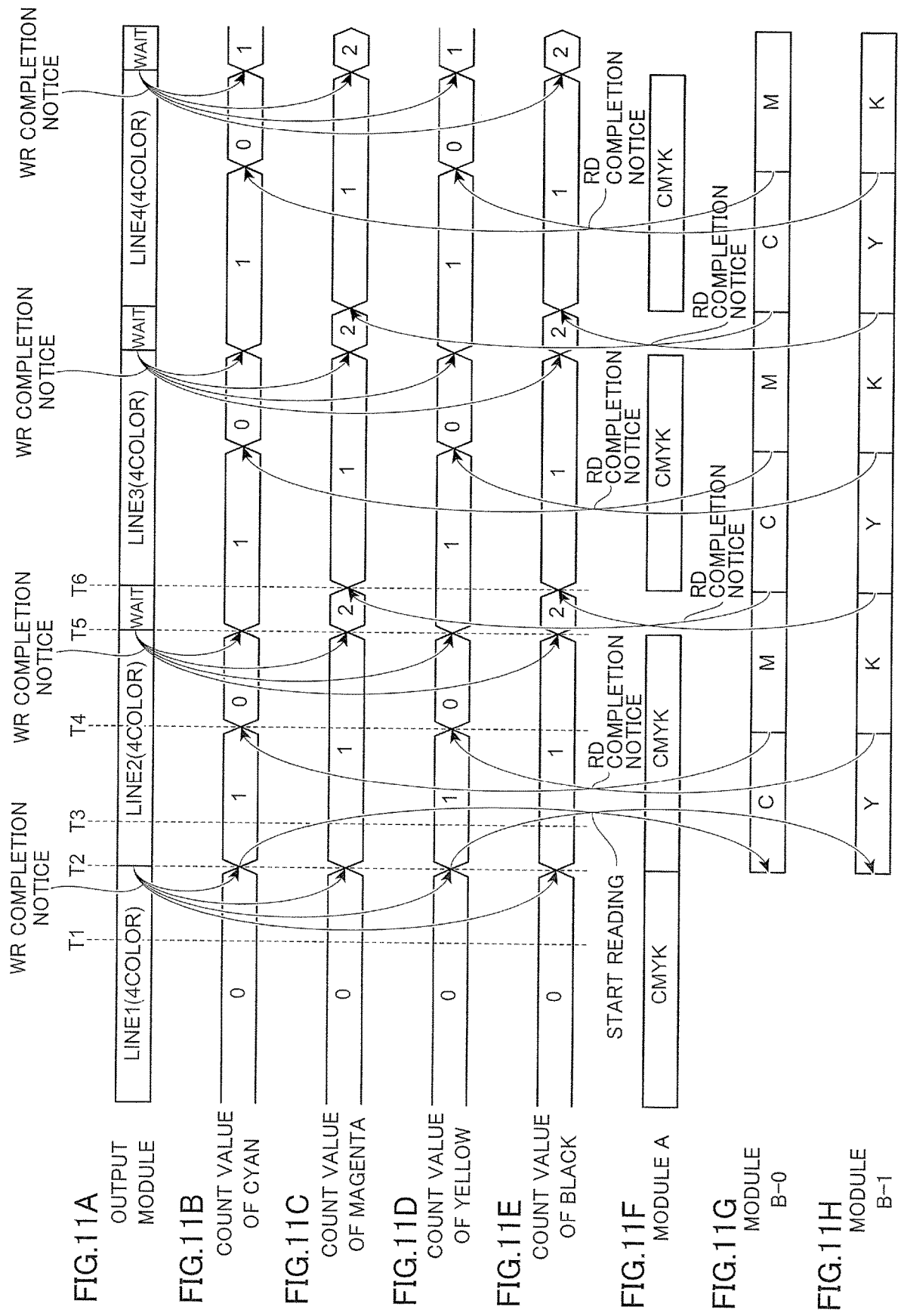

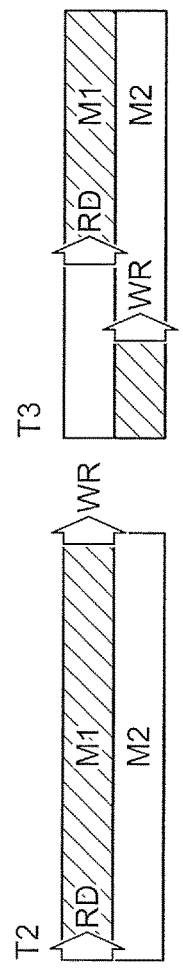
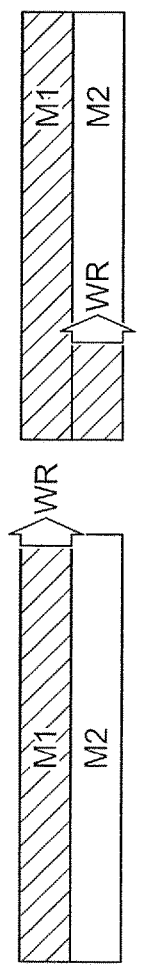
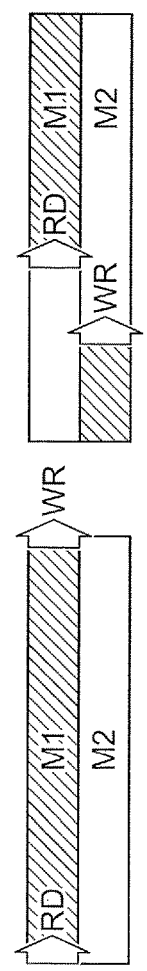
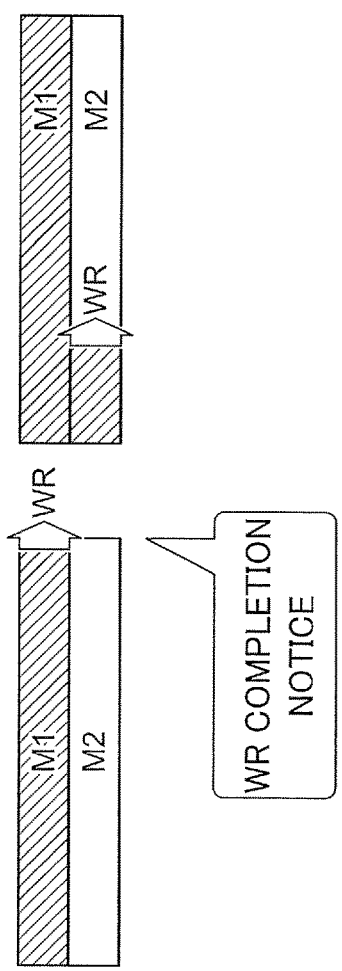
FIG.12A READING AND WRITING OPERATIONS OF 450C
FIG.12B READING AND WRITING OPERATIONS OF 450M
FIG.12C READING AND WRITING OPERATIONS OF 450Y
FIG.12D READING AND WRITING OPERATIONS OF 450K

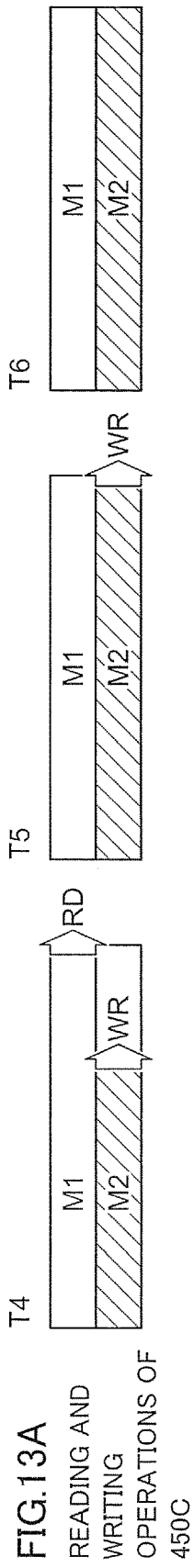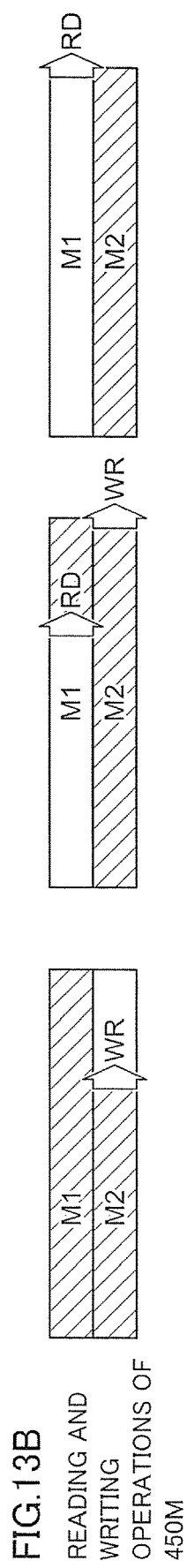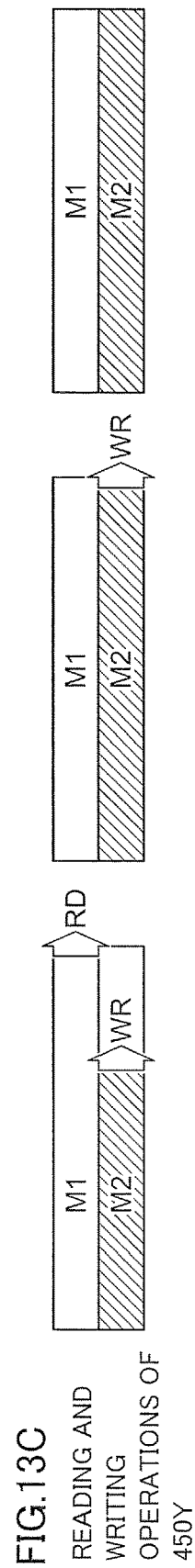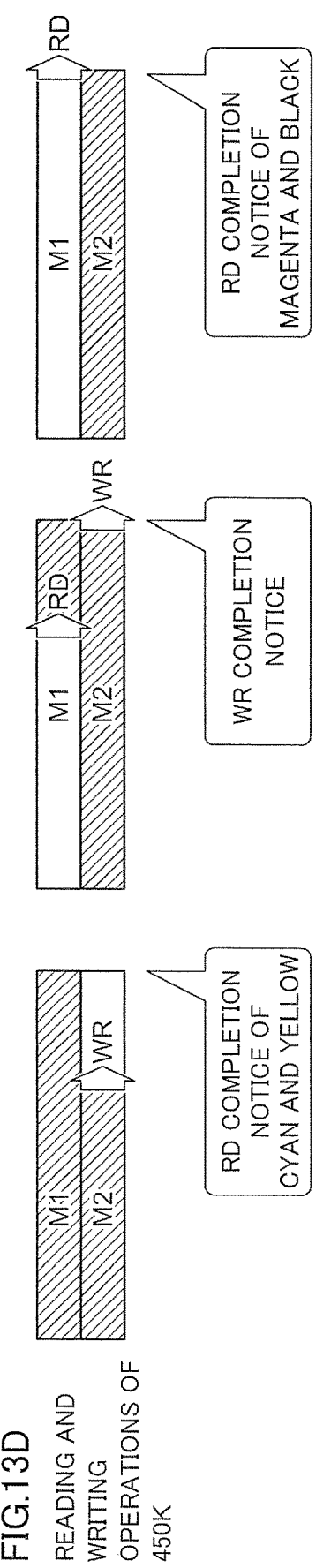
FIG.13A READING AND WRITING OPERATIONS OF 450C
FIG.13B READING AND WRITING OPERATIONS OF 450M
FIG.13C READING AND WRITING OPERATIONS OF 450Y
FIG.13D READING AND WRITING OPERATIONS OF 450K

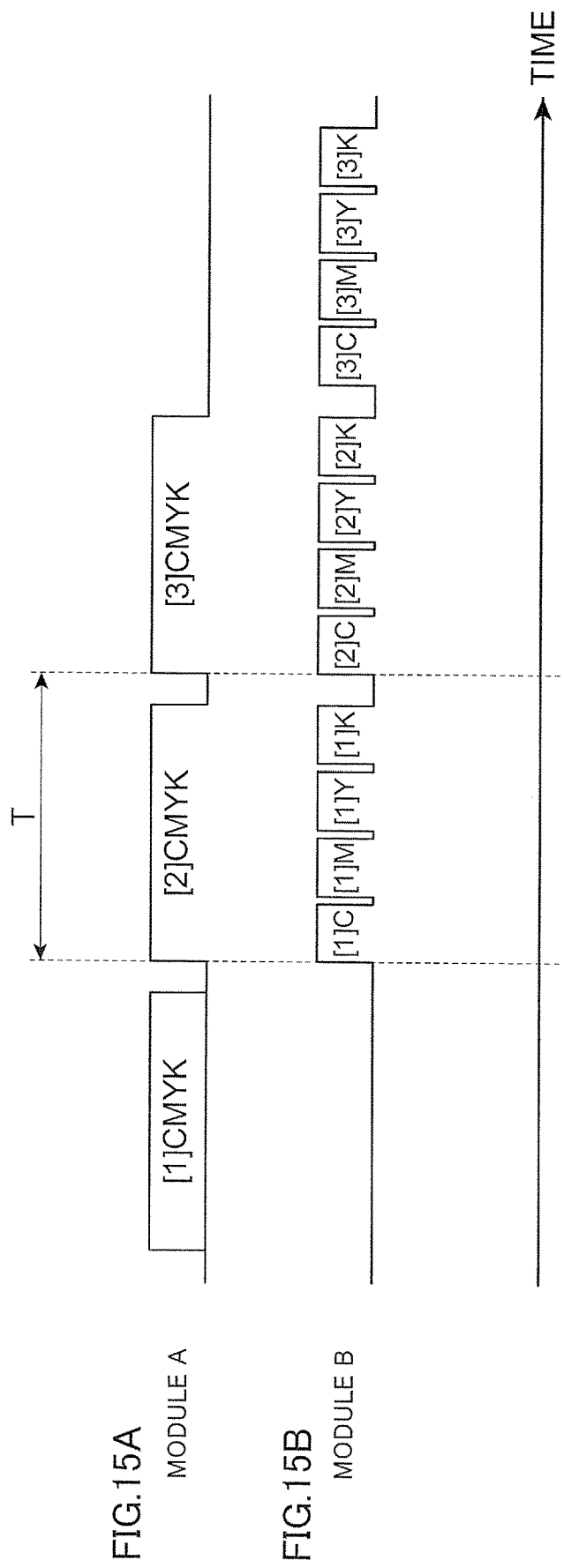
FIG.15A MODULE A
FIG.15B MODULE B

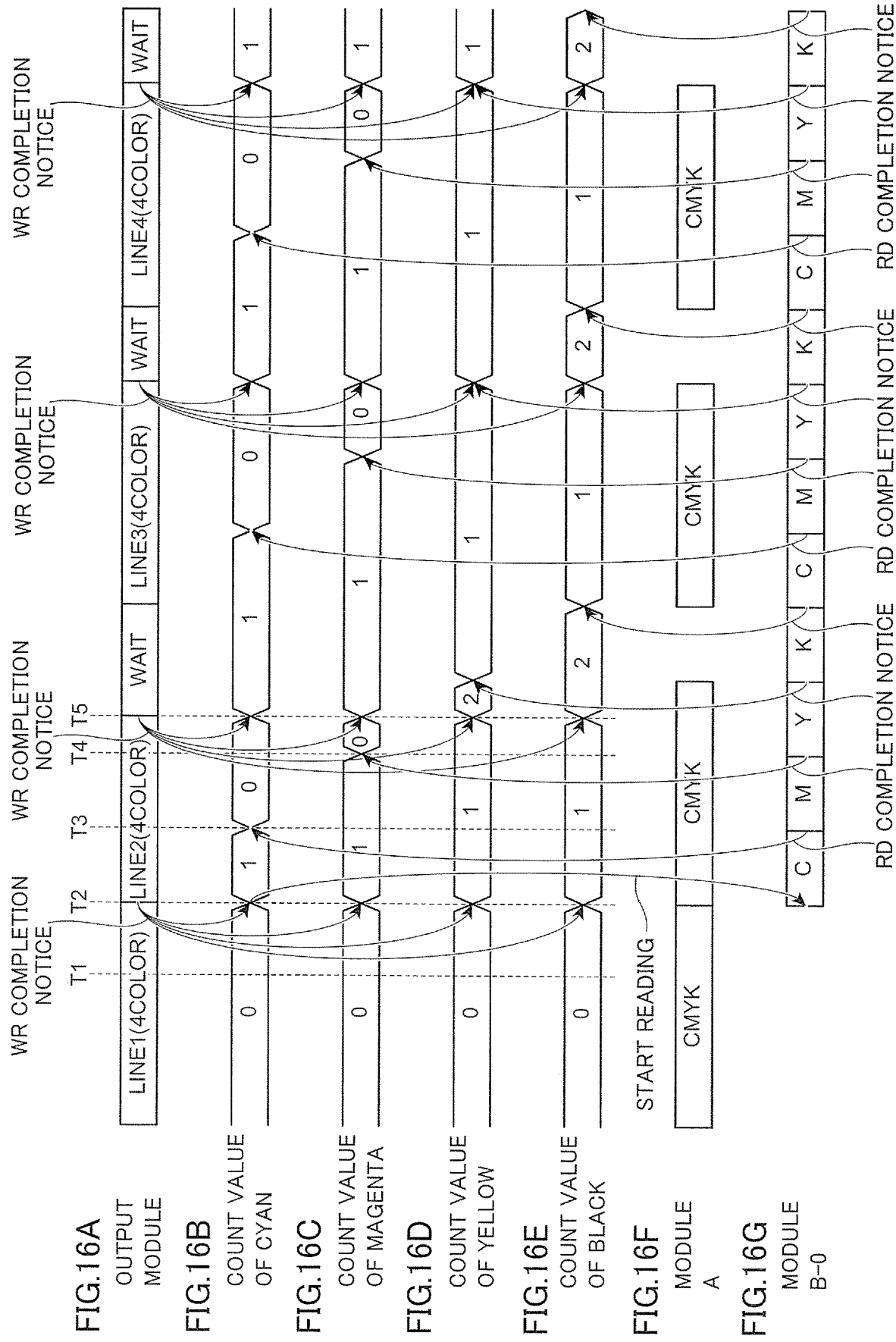

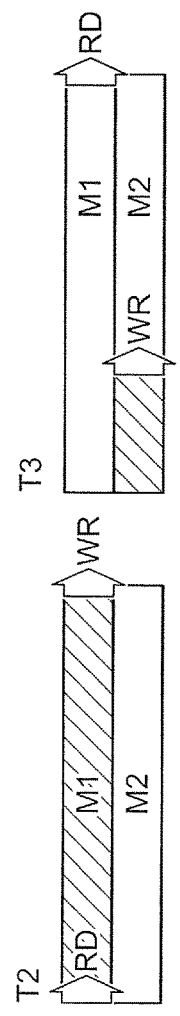
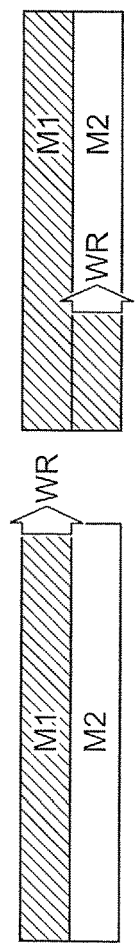
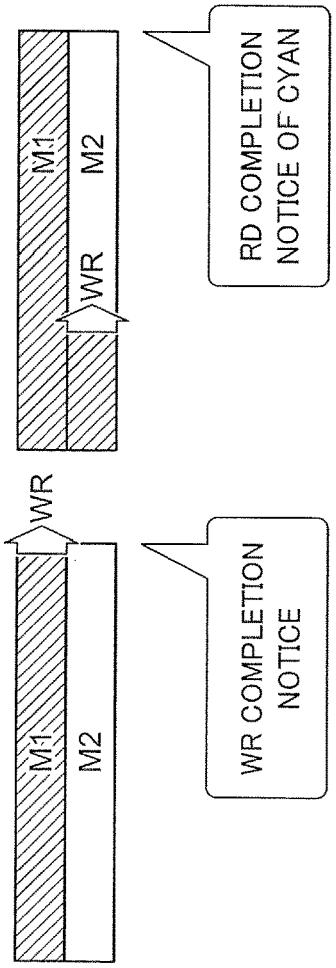
FIG.17A READING AND WRITING OPERATIONS OF 450C
FIG.17B READING AND WRITING OPERATIONS OF 450M
FIG.17C READING AND WRITING OPERATIONS OF 450Y
FIG.17D READING AND WRITING OPERATIONS OF 450K

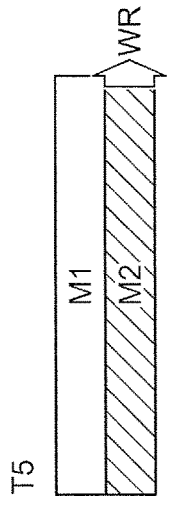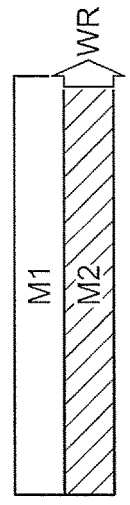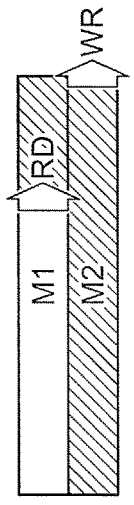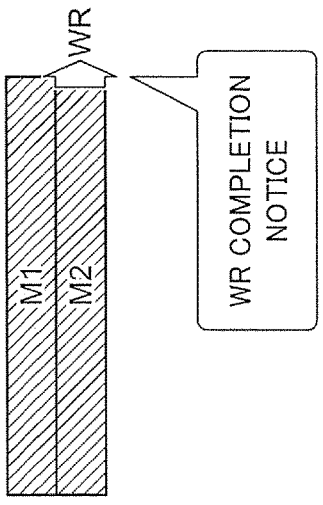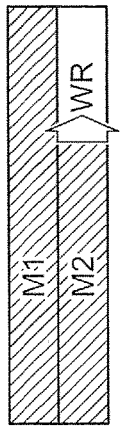
FIG.18A READING AND WRITING OPERATIONS OF 450C
FIG.18B READING AND WRITING OPERATIONS OF 450M
FIG.18C READING AND WRITING OPERATIONS OF 450Y
FIG.18D READING AND WRITING OPERATIONS OF 450K

INFORMATION PROCESSING DEVICE AND IMAGE PROCESSING SYSTEM

CROSS REFERENCE TO RELATED APPLICATIONS

This application is based on and claims priority under 35 USC § 119 from Japanese Patent Application No. 2017-210521 filed Oct. 31, 2017.

BACKGROUND

Technical Field

The present invention relates to an information processing device and an image processing system.

Related Art

There is a system to directly connect two processing units with the same number of color signals to be processable at a time, to thereby perform processing for each color signal in time series by use of the two processing units.

SUMMARY

According to an aspect of the present invention, there is provided an information processing device including: a first processing unit that processes plural color signals at a time and outputs the processed plural color signals in parallel; a memory that temporarily stores the plural color signals outputted in parallel from the first processing unit; and a second processing unit that reads the plural color signals from the memory in order by a processable number at a time, the second processing unit being able to process a smaller number of color signals than the first processing unit, wherein a reading speed from the memory is faster than a writing speed to the memory.

BRIEF DESCRIPTION OF THE DRAWINGS

Exemplary embodiments of the present invention will be described in detail based on the following figures, wherein:

FIGS. 5A to 5C are time sequence charts illustrating an example of a processing operation in a first circuit section and a processing operation in a second circuit section in the first exemplary embodiment, in which FIG. 5A shows a processing operation of the first circuit section (module A), FIG. 5B shows a processing operation of the second circuit section (module B-0) and FIG. 5C shows a processing operation of the second circuit section (module B-1);

FIGS. 11A to 11H are examples of a time sequence chart illustrating progress in processing operations and variations in count values corresponding to the respective color signals in the first exemplary embodiment, in which FIG. 11A illustrates output timing of print data by the module A, FIG. 11B shows variations in a count value corresponding to cyan (C), FIG. 11C shows variations in a count value corresponding to magenta (M), FIG. 11D shows variations in a count value corresponding to yellow (Y), FIG. 11E shows variations in a count value corresponding to black (K), FIG. 11F shows a processing operation of the module A, FIG. 11G shows a processing operation of the module B-0 and FIG. 11H shows a processing operation of the module B-1;

FIGS. 12A to 12D are diagrams illustrating usage conditions of buffer circuits at the times T1, T2 and T3, in which FIG. 12A shows usage conditions of a buffer circuit corresponding to cyan (C), FIG. 12B shows usage conditions of a buffer circuit corresponding to magenta (M), FIG. 12C shows usage conditions of a buffer circuit corresponding to yellow (Y) and FIG. 12D shows usage conditions of a buffer circuit corresponding to black (K);

FIGS. 13A to 13D are diagrams illustrating usage conditions of the buffer circuits at the times T4, T5 and T6, in which FIG. 13A shows usage conditions of a buffer circuit corresponding to cyan (C), FIG. 13B shows usage conditions of a buffer circuit corresponding to magenta (M), FIG. 13C shows usage conditions of a buffer circuit corresponding to yellow (Y) and FIG. 13D shows usage conditions of a buffer circuit corresponding to black (K);

FIGS. 15A and 15B are time sequence charts illustrating an example of a processing operation in a first circuit section and a processing operation in a second operation section in the second exemplary embodiment, in which FIG. 15A shows a processing operation of the first circuit section (module A) and FIG. 15B shows a processing operation of the second circuit section (module B);

FIGS. 16A to 16G are examples of a time sequence chart illustrating progress in processing operations and variations in count values corresponding to the respective color signals in the second exemplary embodiment, in which FIG. 16A illustrates output timing of print data by the module A, FIG. 16B shows variations in a count value corresponding to cyan (C), FIG. 16C shows variations in a count value corresponding to magenta (M), FIG. 16D shows variations in a count value corresponding to yellow (Y), FIG. 16E shows variations in a count value corresponding to black (K), FIG. 16F shows a processing operation of the module A and FIG. 16G shows a processing operation of the module B;

FIGS. 17A to 17D are diagrams illustrating usage conditions of buffer circuits at the times T1, T2 and T3, in which FIG. 17A shows usage conditions of a buffer circuit corresponding to cyan (C), FIG. 17B shows usage conditions of a buffer circuit corresponding to magenta (M), FIG. 17C shows usage conditions of a buffer circuit corresponding to yellow (Y) and FIG. 17D shows usage conditions of a buffer circuit corresponding to black (K);

FIGS. 18A to 18D are diagrams illustrating usage conditions of the buffer circuits at the times T4 and T5, in which FIG. 18A shows usage conditions of a buffer circuit corresponding to cyan (C), FIG. 18B shows usage conditions of a buffer circuit corresponding to magenta (M), FIG. 18C shows usage conditions of a buffer circuit corresponding to yellow (Y) and FIG. 18D shows usage conditions of a buffer circuit corresponding to black (K)

DETAILED DESCRIPTION

Hereinafter, the exemplary embodiments will be described in detail with reference to attached drawings.

Exemplary Embodiment 1

Here, description will be given by taking an image forming apparatus as an example. The image forming apparatus to be described in the first exemplary embodiment forms an image on a recording material (hereinafter, referred to as "sheet" in some cases) and also has a copying function, a scanning function, a facsimile sending/receiving function, a printing function and the like.

However, it is unnecessary for an image processing device to have all these functions; the image processing device may be a device specialized to any one of these functions, such as a copying machine, a scanner (including a three-dimensional scanner), a facsimile machine or a printer (including a three-dimensional printer).

<Outline Configuration of Image Forming Apparatus>

Figure 1:
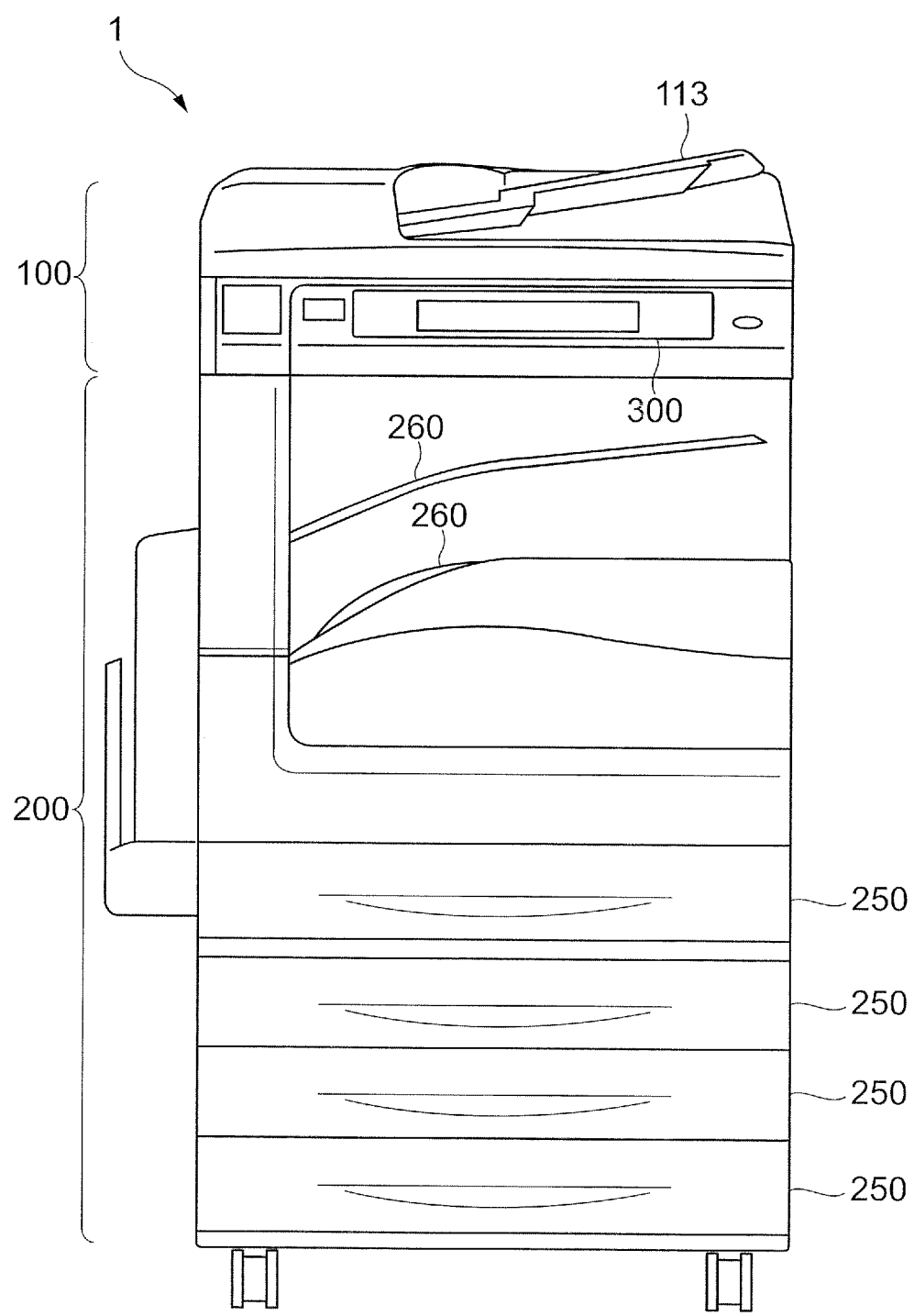
FIG. 1 is a diagram showing an example of an outer appearance of an image forming apparatus related to a first exemplary embodiment.
Figure 2:
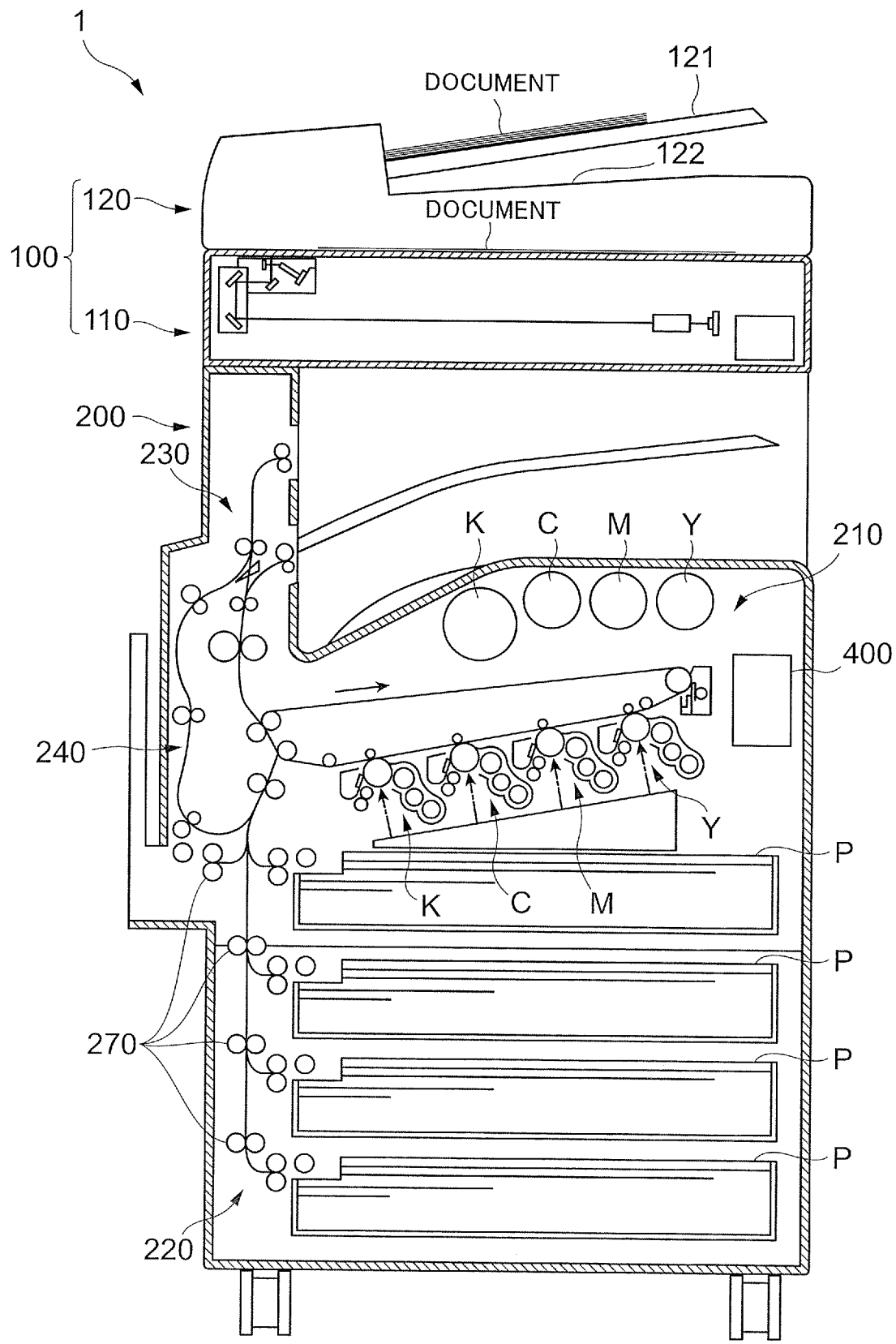
FIG. 2 is a diagram showing an example of an internal configuration of the image forming apparatus related to the first exemplary embodiment.

FIG. 1 is a diagram showing an example of an outer appearance of an image forming apparatus 1 related to the first exemplary embodiment. FIG. 2 is a diagram showing an example of an internal configuration of the image forming apparatus 1 related to the first exemplary embodiment.

The image forming apparatus 1 includes an image reading device 100 that reads an image of a document and an image recording device 200 that records an image on a sheet.

Moreover, the image forming apparatus 1 includes a user interface (UI) 300 that is used to accept an operation by a user or to present various kinds of information items to a user. Further, the image forming apparatus 1 includes a controller 400 that controls entire operations of the image forming apparatus 1.

The image forming apparatus 1 here is an example of an image processing system. Moreover, the controller 400 is an example of an information processing device.

The image reading device 100 is attached onto the top of the image recording device 200 constituting a body part of the apparatus. The image reading device 100 includes an image reading section 110 that reads an image formed on a document and a document feeding section 120 that feeds a document to the image reading section 110. The document feeding section 120 includes a document containing section 121 that contains documents and a document output section 122 that outputs documents picked up from the document containing section 121, and thereby, the documents are transported from the document containing section 121 to the document output section 122 by use of a not-shown transport mechanism. The document feeding section 120 here is also referred to as an auto document feeder (ADF). Note that an image on a document can be read by a method to move a reading optical system relative to the document.

The image recording device 200 includes a mechanism section that forms an image on a surface of a sheet, a mechanism section that transports sheets, and other sections.

The image recording device 200 includes an image forming section 210 that forms an image on a sheet P picked up from a sheet tray 250, a sheet supply section 220 that supplies a sheet P to the image forming section 210, a sheet output section 230 that outputs a sheet P, on which an image has been formed by the image forming section 210, and a reverse transport section 240 that reverses a sheet P outputted from the image forming section 210 upside down, and transports the sheet P again toward the image forming section 210.

The image forming section 210 is provided with recording units corresponding to the respective colors of yellow (Y), magenta (M), cyan (C) and black (K) disposed along a transport path of the sheet P.

Each recording unit includes: a photoconductive drum; a charger that charges a surface of the photoconductive drum; an exposure section that irradiates the photoconductive drum after being charged with laser light to write an image; a developer that develops the written image as a toner image; and a transfer section that transfers the toner image onto a transfer belt. The toner images, which correspond to the respective colors, transferred to the transfer belt is finally transferred onto a surface of a sheet P, to be fixed by a fixing unit. The kinds of colors and combination of colors here are merely an example.

In the lower portion of the image recording device 200, the sheet trays 250 for containing the sheets P are disposed. In the upper portion of the image recording device 200, plural output trays 260 for outputting the sheets P, on each of which the image is formed, are disposed.

The user interface 300 is disposed at a frontward side of the image reading device 100 so that an operation surface of the user interface 300 faces a user who operates the image forming apparatus 1.

The user interface 300 includes an operation section that accepts instructions from a user and a display that provides information to a user. The operation section includes, for example, a function of detecting operation to hardware keys or software keys, and so forth. The display shows the software keys or the like as a screen for operation.

The controller 400 is provided inside a housing of the image recording device 200.

Figure 3:
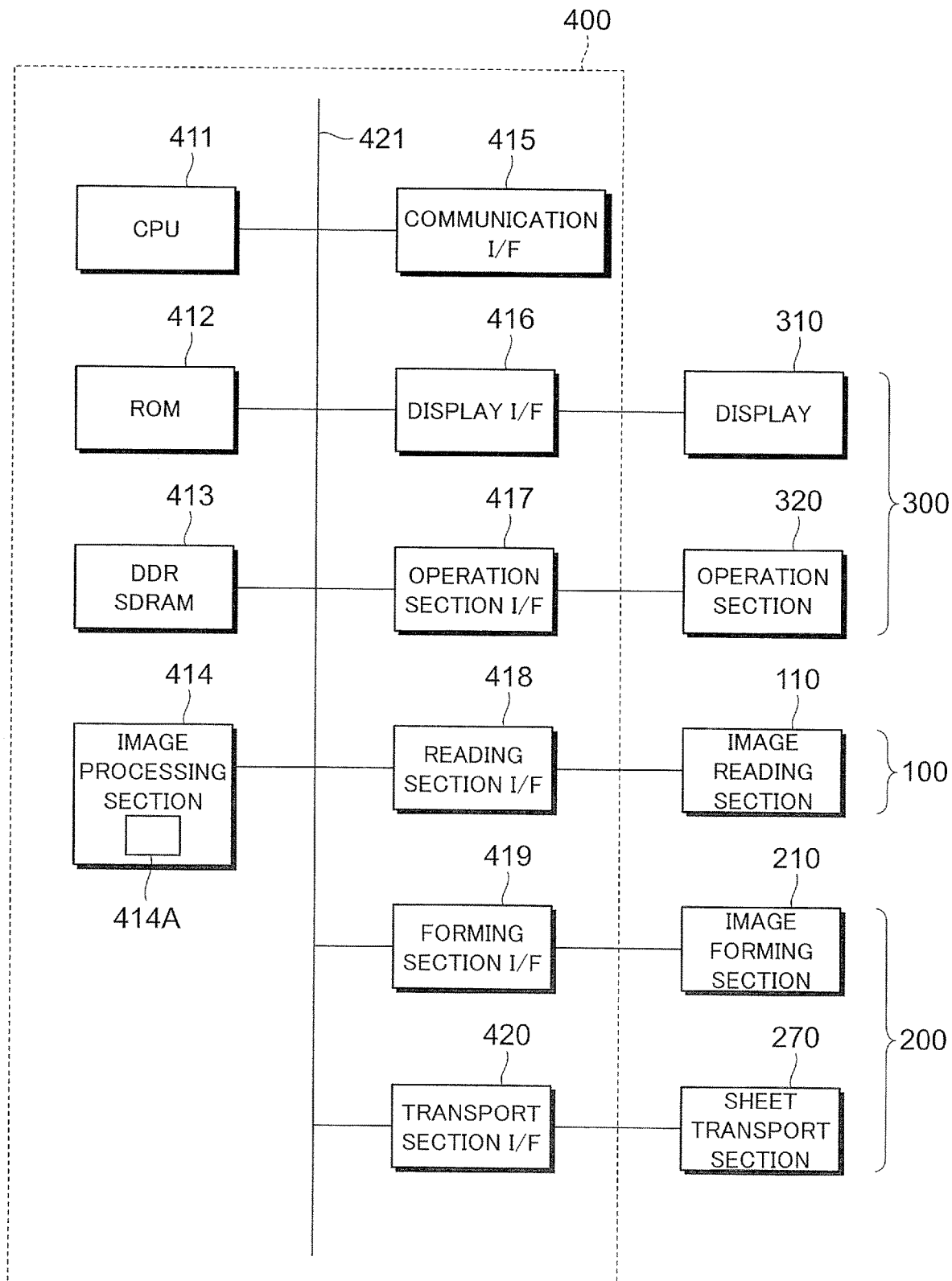
FIG. 3 is a diagram illustrating a connection relationship between a controller and other components.

FIG. 3 is a diagram illustrating a connection relationship between the controller 400 and other components.

The controller 400 includes: a CPU (Central Processing Unit) 411; a ROM (Read Only Memory) 412 storing firmware, BIOS (Basic Input/Output System) or the like; and a DDR SDRAM 413 used as a work area of the CPU 411, which constitute a general computer.

Hereinafter, the DDR SDRAM 413 is referred to as a RAM 413. Note that the RAM 413 is an example of a first memory.

The CPU 411 also functions as a data processing section through running of the firmware.

The controller 400 includes an image processing section 414 that performs various kinds of processing required to form an image (for example, color correction, gradation correction or the like). The image processing section 414 performs image processing by use of the RAM 413.

The image processing section 414 that performs image processing includes a circuit section processing all print data corresponding to the four colors of cyan (C), magenta (M), yellow (Y) and black (K) in parallel and a circuit section sequentially processing print data by each color outputted from the circuit section processing the all print data in parallel. In the exemplary embodiment, a part of the image processing section 414 including these circuit sections is referred to as a partial circuit 414A.

The controller 400 is provided with an interface (I/F) used for delivery and receipt of data with external devices. For example, there are provided: a communication interface (communication I/F) 415, used for communicating with external terminals; a display interface (display I/F) 416 outputting image data to the display 310; an operation section interface (operation section I/F) 417 inputting data related to operations accepted from the operation section 320; a reading section interface (reading section I/F) 418 inputting image data from the image reading section 110; a forming section interface (forming section I/F) 419 outputting image data to the image forming section 210; a transport section interface (transport section I/F) 420 outputting data to drive a sheet transport section 270, and so forth.

Note that the controller 400 is also provided with an HDD (hard disk device), which is an example of a nonvolatile memory.

The CPU 411 and each component are connected via a bus 421. The bus 421 here may have a configuration in which plural buses are connected via bridges.

Each of the display 310 and the image forming section 210 is an example of an output unit.

<Partial Configuration of Image Processing Section>

Figure 4:
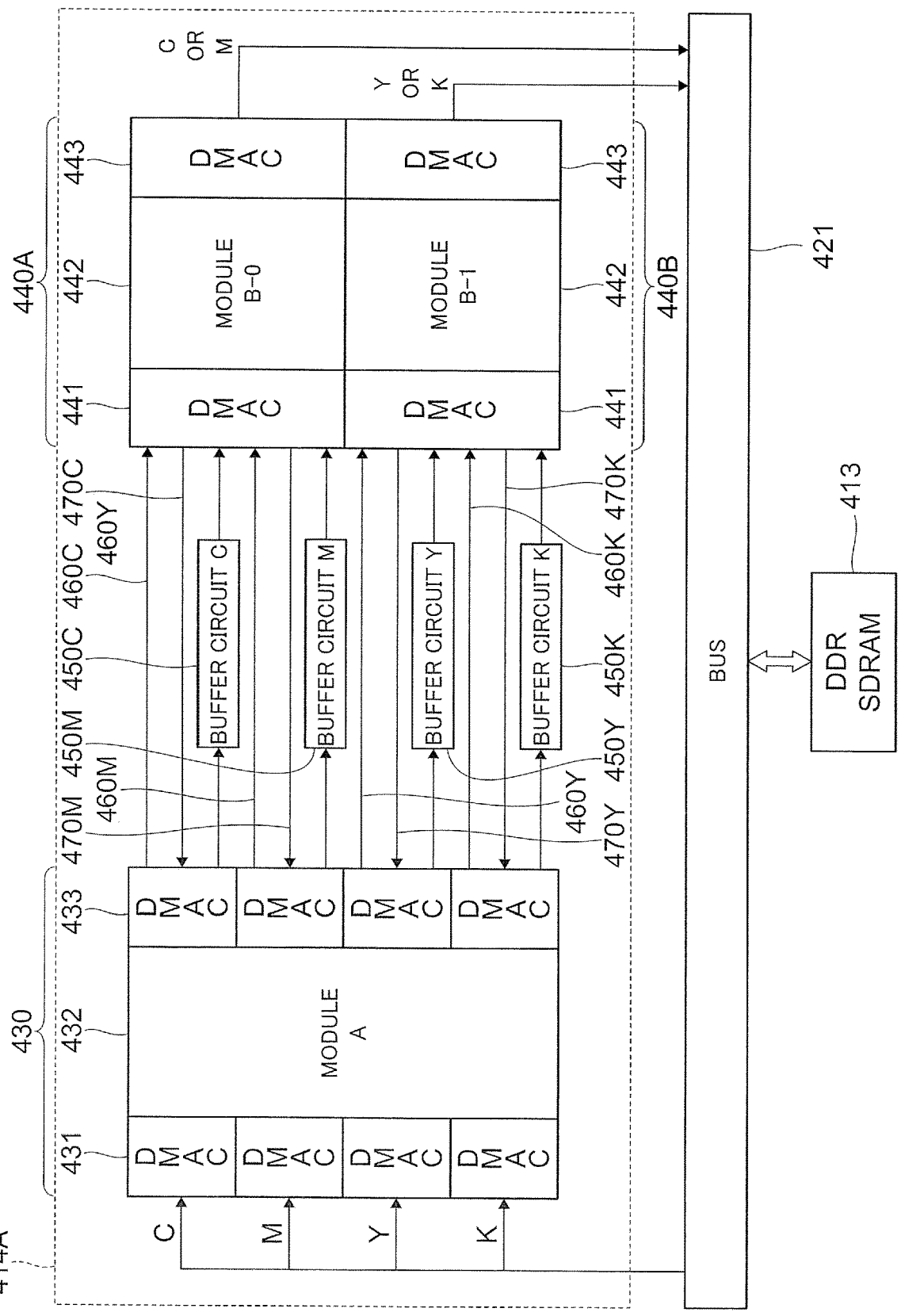
FIG. 4 is a diagram illustrating a configuration example of a partial circuit constituting a part of an image processing section in the first exemplary embodiment.

FIG. 4 is a diagram illustrating a configuration example of a partial circuit 414A constituting a part of an image processing section 414 (refer to FIG. 3) in the first exemplary embodiment.

The partial circuit 414A in the exemplary embodiment includes: a first circuit section 430 that processes print data of four colors in parallel; two second circuit sections 440A and 440B that sequentially process the print data outputted from the first circuit section 430 by each color; four buffer circuits 450C, 450M, 450Y and 450K that can store the print data by two lines; first signal lines 460C, 460M, 460Y and 460K used for notifying completion of writing (WR completion notice) of print data by one line to the buffer circuits 450C, 450M, 450Y and 450K; and second signal lines 470C, 470M, 470Y and 470K used for notifying completion of reading (RD completion notice) of print data by one line from the buffer circuits 450C, 450M, 450Y and 450K.

The line in the exemplary embodiment refers to the size of the print data assumed as a unit of processing by the first circuit section 430 and the second circuit sections 440A and 440B. Transfer of print data from the first circuit section 430 to the second circuit sections 440A and 440B is performed by a line unit.

Hereinafter, when the second circuit sections 440A and 440B are collectively called, they are referred to as a second circuit section 440.

When the buffer circuits 450C, 450M, 450Y and 450K are collectively called, they are referred to as a buffer circuit 450.

When the first signal lines 460C, 460M, 460Y and 460K are collectively called, they are referred to as a first signal line 460, and when the second signal lines 470C, 470M, 470Y and 470K are collectively called, they are referred to as a second signal line 470.

The first circuit section 430 is an example of a first processing unit, and the second circuit sections 440A and 440B are an example of a second processing unit.

The buffer circuits 450C, 450M, 450Y and 450K are an example of a memory, and also an example of a second memory.

The print data is an example of image data.

The image data is an example of an image signal.

The print data or image data corresponding to each color is an example of a color signal.

In the case of the exemplary embodiment, the partial circuit 414A (the first circuit section 430, the second circuit section 440 and the buffer circuit 450) and the bus 421 are formed on a single semiconductor substrate. Note that the image processing section 414 including the partial circuit 414A and the bus 421 may be formed on a single semiconductor substrate.

Moreover, the single semiconductor substrate may include other circuit elements (for example, the CPU 411, the ROM 412, the RAM 413 and various kinds of interfaces). The combination of the circuit elements is arbitrarily formed on the single semiconductor substrate.

In the exemplary embodiment, the first circuit section 430 is referred to as a module A and the second circuit section 440 is referred to as a module B in some cases.

When the two modules collectively called is to be distinguished from each other, the second circuit section 440A is referred to as a module B-0 and the second circuit section 440B is referred to as a module B-1.

The module B-0 takes charge of processing of two colors of cyan (C) and magenta (M), and the module B-1 takes charge of processing of two colors of yellow (Y) and black (K).

In the case of the exemplary embodiment, the buffer circuit 450K is configured with a ring buffer having a storage region corresponding to two lines.

As described above, one line corresponds to a unit of print data transferred between the first circuit section 430 and the second circuit section 440.

In the case of the exemplary embodiment, the storage region for two lines is prepared to the buffer circuit 450 to enable writing operation to the buffer circuit 450 and reading operation from the buffer circuit 450 in parallel.

Note that the storage capacity of the buffer circuit 450 may be three lines or more. In the exemplary embodiment, since transfer of the print data is managed in line unit, the storage capacity of the buffer circuit 450 is set to an integral multiple of the line.

The contents of processing performed in the first circuit section 430 and the second circuit section 440 are determined in accordance with, of the processing performed in the image processing section 414, the processing of which the circuit sections take charge.

The first circuit section 430 reads the print data of four colors from the RAM 413 via the bus 421, performs predetermined processing, and thereafter, outputs the data in parallel to the buffer circuits 450C, 450M, 450Y and 450K corresponding to the print data of four colors. The output here is performed in line unit in accordance with free space of the storage region in the buffer circuit 450.

On the other hand, from the buffer circuits 450C and 450M corresponding to cyan (C) and magenta (M), respectively, the second circuit section 440A alternately reads the print data corresponding to each color by one line unit, and writes the result of performing the predetermined processing to the RAM 413 via the bus 421.

From the buffer circuits 450Y and 450K corresponding to yellow (Y) and black (K), respectively, the second circuit section 440B alternately reads the print data corresponding to each color by one line unit, and writes the result of performing the predetermined processing to the RAM 413 via the bus 421.

The first circuit section 430 includes: four DMACs (Direct Memory Access Controller) 431 separated by colors for directly reading the print data for four colors from the RAM 413 without the CPU 411; a module section 432 that performs predetermined processing; and four DMACs 433 separated by colors for directly writing the print data for four colors to the corresponding buffer circuit 450 without the CPU 411.

The second circuit section 440A includes: DMACs 441 for directly reading the print data of two colors from the buffer circuit 450 without the CPU 411; a module section 442 that performs predetermined processing; and DMACs 443 for directly writing the print data of two colors to the RAM 413 without the CPU 411. The second circuit section 440B also has the configuration same as the second circuit section 440A.

Figure 5:
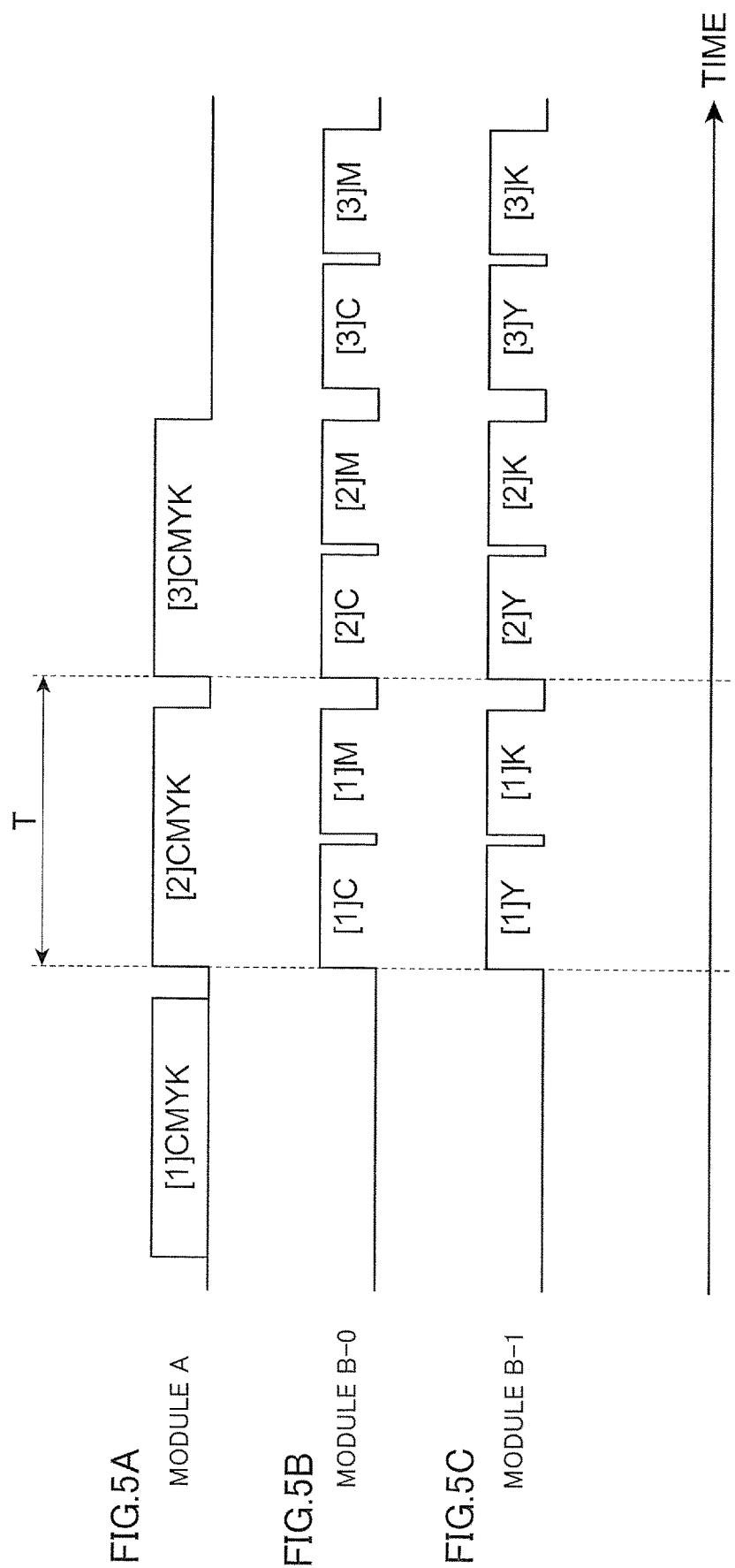

FIGS. 5A to 5C are time sequence charts illustrating an example of a processing operation in the first circuit section 430 and a processing operation in the second circuit section 440 in the first exemplary embodiment. Here, FIG. 5A shows a processing operation of the first circuit section 430 (module A), FIG. 5B shows a processing operation of the second circuit section 440A (module B-0) and FIG. 5C shows a processing operation of the second circuit section 440B (module B-1). The horizontal axis in FIGS. 5A to 5C represents time.

To illustrate the processing performed in the first circuit section 430 and the second circuit section 440, the time sequence charts shown in FIGS. 5A to 5C show only a part of processing actually performed.

The first circuit section 430 shown in FIGS. 5A to 5C process the print data corresponding to the four colors of cyan (C), magenta (M), yellow (Y) and black (K) in parallel within a period T. In the figure, processing is performed during a period in which the waveform is rising, and the processed print data is transferred to a next stage during a period in which the waveform is falling. Consequently, the first circuit section 430 performs processing predetermined for each color by use of all the periods in which the waveform is rising.

The second circuit section 440A processes the print data corresponding to cyan (C) and the print data corresponding to magenta (M) sequentially in time series within the period T. In the figure, processing is performed during a period in which the waveform is rising, and the processed print data is transferred to a next stage during a period in which the waveform is falling.

During the period of waveform falling disposed between the processing of cyan (C) and the processing of magenta (M), the print data to be processed is switched.

On the other hand, the second circuit section 440B processes the print data corresponding to yellow (Y) and the print data corresponding to black (K) sequentially in time series within the period T. Also, in the case of the second circuit section 440B, processing is performed during a period in which the waveform is rising, and the processed print data is transferred to a next stage during a period in which the waveform is falling.

During the period of waveform falling disposed between the processing of yellow (Y) and the processing of black (K), the print data to be processed is switched.

As shown in FIGS. 5A to 5C, while the first circuit section 430 processes the print data of one color (during the period T), the second circuit section 440 processes the print data of two colors. In other words, the time used by the second circuit section 440 to process the print data of one color is less than half the time used by the first circuit section 430 to process the print data of one color. To put it another way, the processing speed of the second circuit section 440 is more than double the processing speed of the first circuit section 430.

The twice the value is determined based on the ratio between the number of processable color signals by the first circuit section 430 at a time (namely, four) and the number of processable color signals by the second circuit section 440 at a time (namely, two) (therefore, the ratio is 2). However, though the value is not necessarily twice in an exact way, when the value is approximated to twice as much as possible, the standby time in data transfer is reduced.

Figure 6:
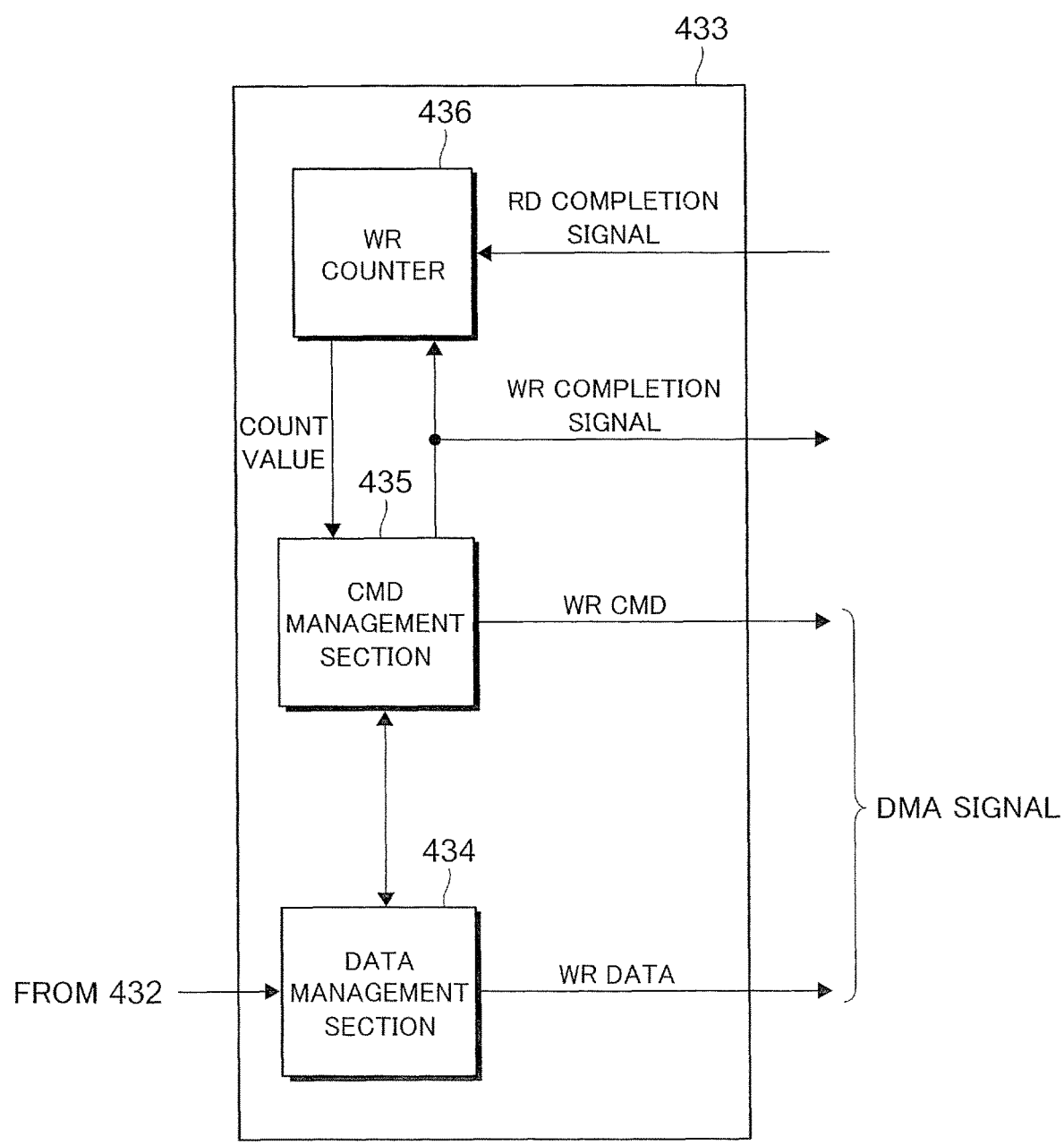
FIG. 6 is a diagram illustrating an example of a functional configuration of a DMAC provided to an output side of the first circuit section.

FIG. 6 is a diagram illustrating an example of a functional configuration of the DMAC 433 provided to an output side of the first circuit section 430.

The DMAC 433 is a circuit for directly writing the print data to the buffer circuit 450 without the CPU and is prepared for each color. The DMAC 433 shown in FIG. 6 includes: a data (DATA) management section 434 that reads data from the module section 432 and outputs thereof as write data (WR DATA) to the corresponding buffer circuit 450; a command (CMD) management section 435 that outputs write command (WR CMD) to the corresponding buffer circuit 450; and a write (WR) counter 436 that manages the number of lines used in the buffer circuit 450.

The write data (WR DATA) and the write command (WR CMD) here are collectively referred to as a DMA signal.

The command (CMD) management section 435 generates a write (WR) completion signal every time writing of the write data (WR DATA) for one line is completed. The write (WR) completion signal is used for incrementing counter values of the write (WR) counter 436 and a read (RD) counter 446 (refer to FIG. 7), which will be described later.

Moreover, the command (CMD) management section 435 controls writing operation to the buffer circuit 450 based on the count value of the write (WR) counter 436. When all of the count values corresponding to the respective colors is "2", the command (CMD) management section 435 in the exemplary embodiment controls to stop the performance of writing operation to be brought into a temporary standby state.

Figure 7:
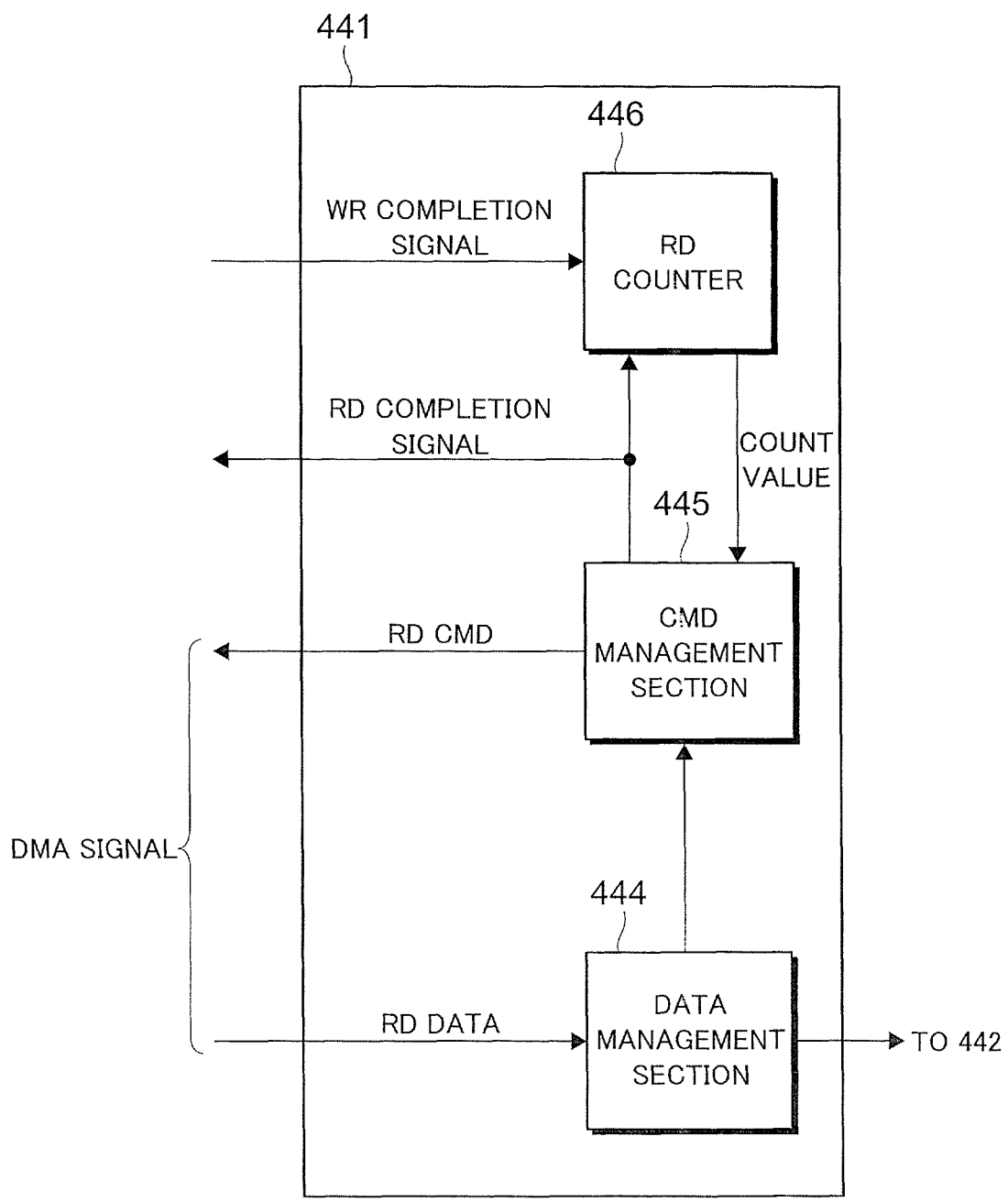
FIG. 7 is a diagram illustrating an example of a functional configuration of a DMAC provided to an input side of the second circuit section.

FIG. 7 is a diagram illustrating an example of a functional configuration of the DMAC 441 provided to an input side of the second circuit section 440.

The DMAC 441 is a circuit for directly reading the print data from the buffer circuit 450 without the CPU and is prepared for each color. The DMAC 441 shown in FIG. 7 includes: a data (DATA) management section 444 that outputs read data (RD DATA) from the corresponding buffer circuit 450 to the module section 442; a command (CMD) management section 445 that outputs a read command (RD CMD) to the corresponding buffer circuit 450; and a read (RD) counter 446 that manages the number of lines used in the buffer circuit 450.

The read data (RD DATA) and the read command (RD CMD) here are collectively referred to as a DMA signal.

The command (CMD) management section 445 generates a read (RD) completion signal every time reading of the read data (RD DATA) for one line is completed. The read (RD)

completion signal is used for decrementing counter values of the write (WR) counter 436 (refer to FIG. 6) and the read (RD) counter 446.

Moreover, the command (CMD) management section 445 controls timing of performing the reading operation based on the count value of the read (RD) counter 446. The command (CMD) management section 445 in the exemplary embodiment controls to stop the reading operation from the buffer circuit 450 corresponding to the color whose count value is "0" to be brought into a temporary standby state.

Figure 8:
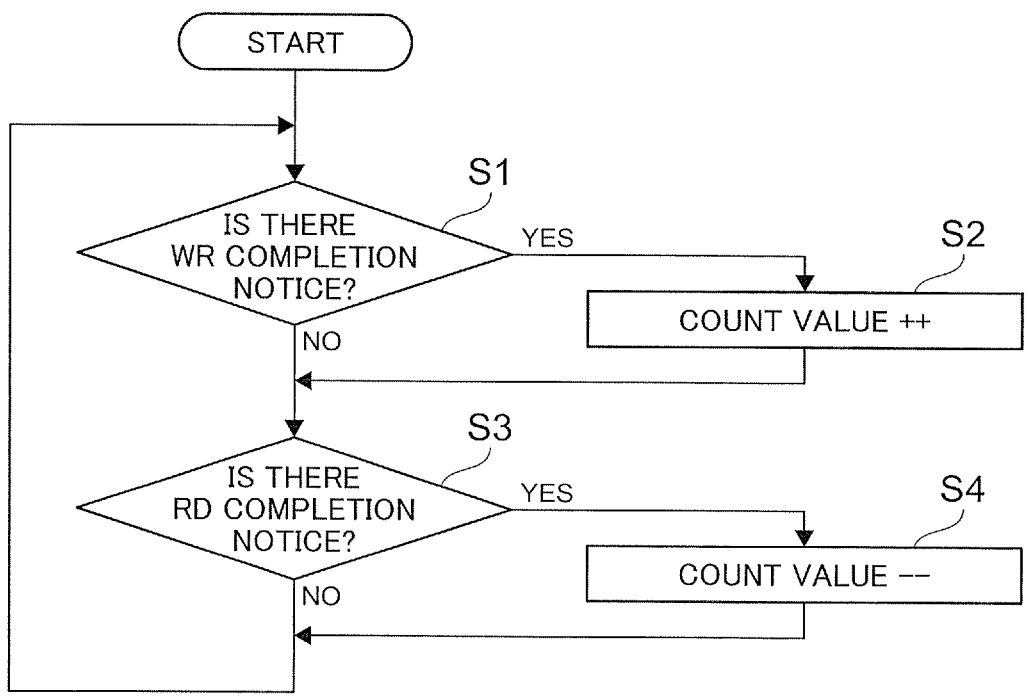
FIG. 8 is a flowchart illustrating operations performed by a write (WR) counter and a read (RD) counter.

FIG. 8 is a flowchart illustrating operations performed by the write (WR) counter 436 (refer to FIG. 6) and the read (RD) counter 446 (refer to FIG. 7).

Here, the write (WR) counter 436 and the read (RD) counter 446 are collectively referred to as a counter.

The counter determines whether or not the write (WR) completion notice has been received (step 1), and when an affirmative result is obtained, increments the count value by 1 (step 2). On the other hand, when a negative result is obtained in step 1, the counter determines whether or not the read (RD) completion notice has been received (step 3). When an affirmative result is obtained in step 3, the counter decrements the count value by 1 (step 4), and when a negative result is obtained, the process returns to step 1.

By repeating the above-described operations, the counter grasps the usage status of the buffer circuit 450 that relays the print data.

In the exemplary embodiment, the maximum value of the count value is the number of lines in the storage region provided to the buffer circuit 450 (two in the exemplary embodiment) and the minimum value thereof is 0.

The count value being the maximum value means that there is no free space for one line in the buffer circuit 450. On the other hand, the count value being the minimum value means that there is no print data to be read in the storage region of the buffer circuit 450.

Figure 9:
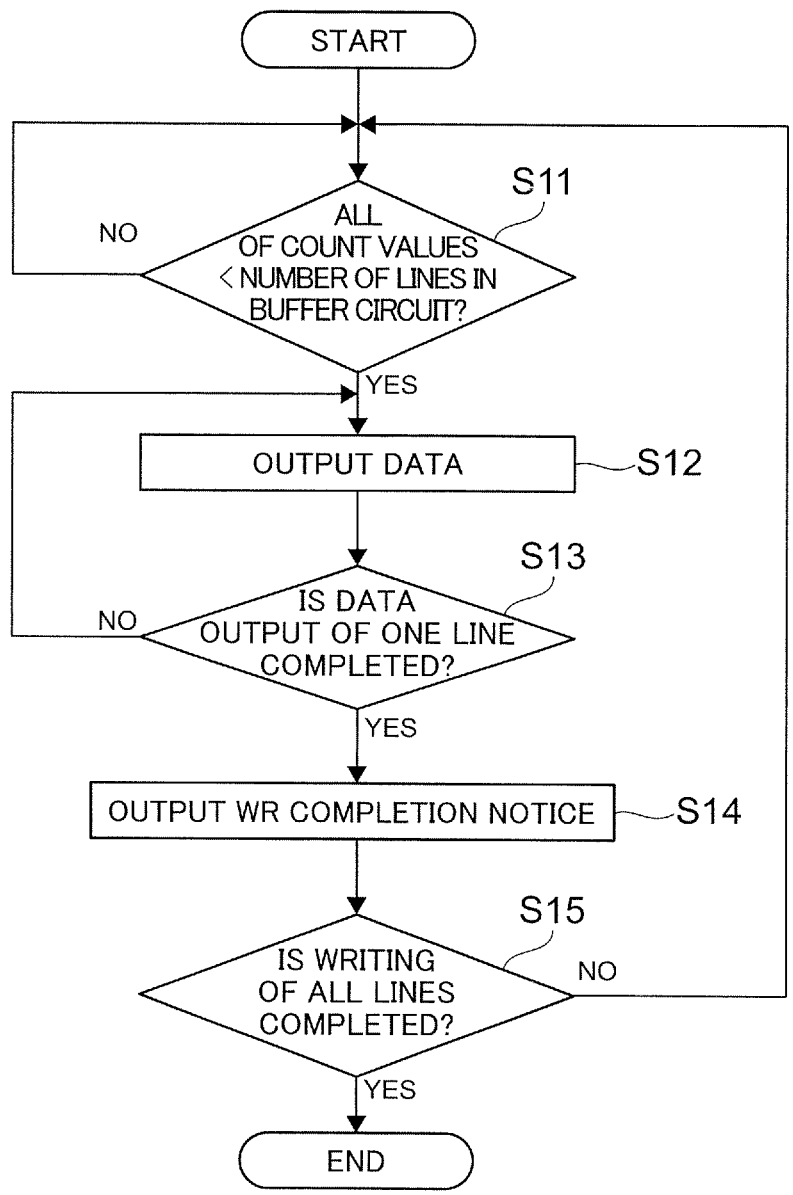
FIG. 9 is a flowchart illustrating an example of a processing operation individually performed by each of four DMACs constituting an output stage of the first circuit section.

FIG. 9 is a flowchart illustrating an example of a processing operation individually performed by each of four DMACs 433 (refer to FIG. 4) constituting an output stage of the first circuit section 430 (refer to FIG. 4).

The processing operation shown in FIG. 9 is performed by cooperation of the command (CMD) management section 435 (refer to FIG. 6) and the data (DATA) management section 434 (refer to FIG. 6).

First, the DMAC 433 determines whether or not a count value corresponding to all of the four colors is smaller than the number of lines of the buffer circuit 450 (refer to FIG. 4) (step 11). In the case of the exemplary embodiment, the number of lines is "2".

While the negative result is obtained in step 11 (that is, all of the count values is 2), the DMAC 433 repeats determination in step 11. This is because new color signals cannot be written to the buffer circuits 450C, 450M, 450Y, 450K in parallel.

When the affirmative result is obtained in step 11 (that is, when the count value is 0 or 1), the DMAC 433 starts outputting of the data (color signal) (step 12). Subsequently, the DMAC 433 determines whether or not the output of one line has been completed (step 13). As described above, one line is a unit of transfer.

While the negative result is obtained in step 13, the DMAC 433 continues to output the data (color signal).

When the affirmative result is obtained in step 13, the DMAC 433 outputs the write (WR) completion notice (step 14).

Thereafter, the DMAC 433 determines whether or not writing of all the lines has been completed (step 15).

While the negative result is obtained in step 15 (the color signal to be transmitted to the buffer circuit 450 is remained), the process returns to step 11 and the DMAC 433 repeats the above-described operation.

When the affirmative result is obtained in step 15, the DMAC 433 ends the above-described operation.

Figure 10:
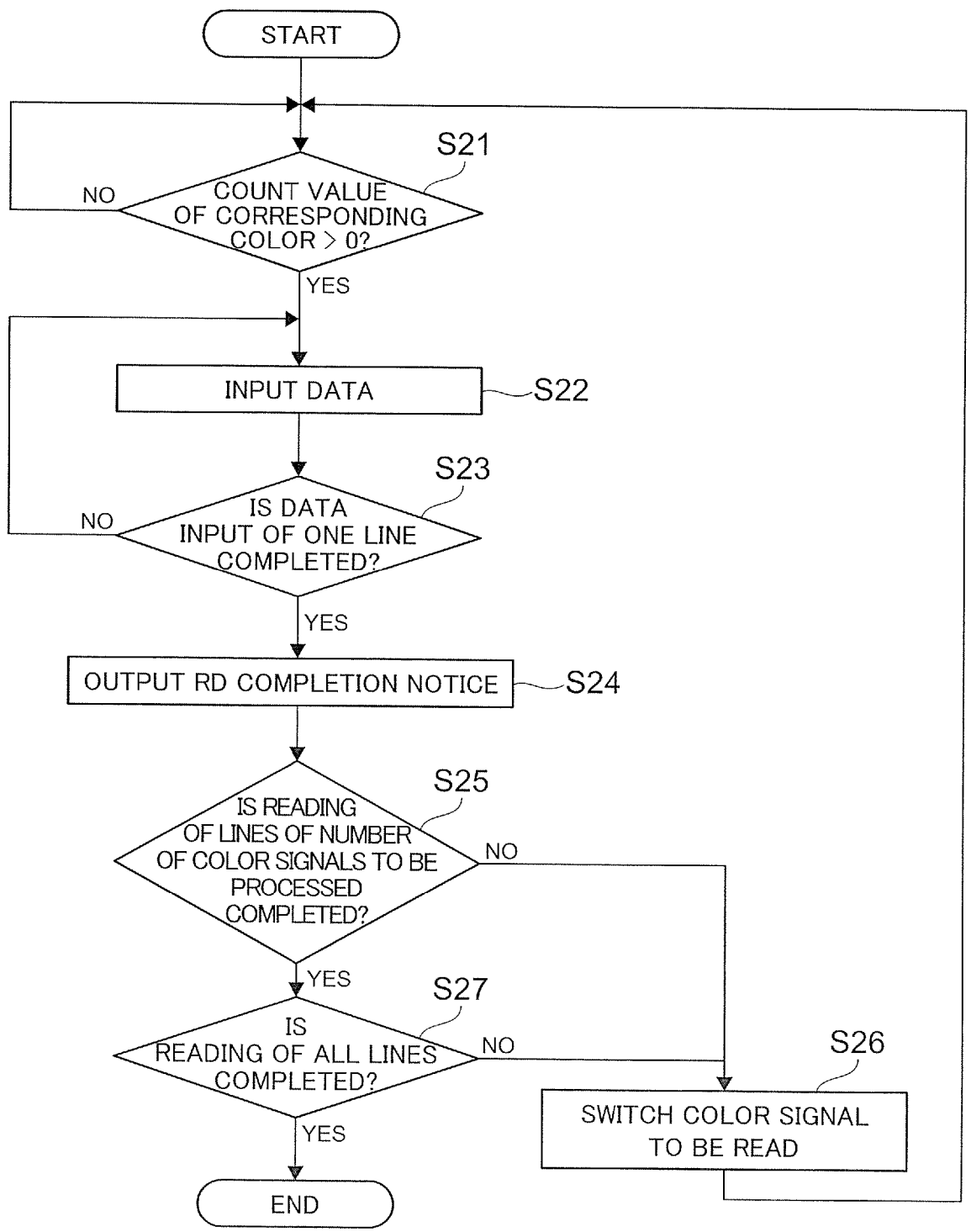
FIG. 10 is a flowchart illustrating an example of a processing operation individually performed by each of four DMACs constituting an input stage of the second circuit section.

FIG. 10 is a flowchart illustrating an example of a processing operation individually performed by each of two DMACs 441 (refer to FIG. 4) constituting an input stage of the second circuit section 440 (refer to FIG. 4).

The processing operation shown in FIG. 10 is performed by cooperation of the command (CMD) management section 445 (refer to FIG. 7) and the data (DATA) management section 444 (refer to FIG. 7).

First, the DMAC 441 determines whether or not the count value of the color, which is an object of reading, is larger than 0 (step 21).

While the negative result is obtained in step 21 (that is, the count values is 0), the DMAC 441 repeats determination in step 21. This is because no data (color signal) to be read exists in the buffer circuit 450 of the color that is an object of reading.

When the affirmative result is obtained in step 21 (that is, when the count value is 1 or 2), the DMAC 441 starts inputting of the data (color signal) (step 22).

Subsequently, the DMAC 441 determines whether or not the input of one line has been completed (step 23). As described above, one line is a unit of transfer.

While the negative result is obtained in step 23, the DMAC 441 continues to input the data (color signal).

When the affirmative result is obtained in step 23, the DMAC 441 outputs the read (RD) completion notice (step 24).

Thereafter, the DMAC 441 determines whether or not reading the lines of the number of color signals to be processed has been finished (step 25). In the case of the exemplary embodiment, since the number of color signals to be processed by the DMAC 441 is "2", it is determined whether or not reading of two lines has been finished.

For example, it is determined whether or not the count value representing the number of read lines is an even number. Moreover, for example, when the count value representing the number of read lines becomes 2, the value is reset to 0 and it is determined whether the current count value is 0.

When the negative result is obtained in step 25, the DMAC 441 performs processing to switch the color signal to be read (step 26). For example, the DMAC 441 operating as the module B-0 switches the color signal to be read from cyan (C) to magenta (M). Thereafter, the process returns to step 21 and the DMAC 441 performs processing related to input of the data (color signal) corresponding to magenta (M) from the buffer circuit 450.

In contrast thereto, when the affirmative result is obtained in step 25, the DMAC 441 determines whether or not reading of all the lines has been finished (step 27). For example, in a case where the color signal transferred from the first circuit section 430 to the second transfer circuit section 440 is configured with 100 lines, it is determined, for each of the two color signals to be processed, reading of 100 lines has been finished or not.

When the negative result is obtained in step 27, the process proceeds to step 26 and the DMAC 441 switches the color signal to be read. The switching here is the switching for processing the next line. For example, the DMAC 441 operating as the module B-0 switches the color signal to be read from magenta (M) to cyan (C).

Thereafter, the process returns to step 21 and the DMAC 441 repeats processing related to input of the data (color signal) corresponding to cyan (C) from the buffer circuit 450.

On the other hand, when the affirmative result is obtained in step 27, the DMAC 441 ends the series of reading operations.

<Details of Processing Operation>

Hereinafter, by use of FIGS. 11 to 13, description will be given of details of reading and writing data performed between the first circuit section 430 and the second circuit section 440.

FIGS. 11A to 11H are examples of a time sequence chart illustrating progress in processing operations and variations in count values corresponding to the respective color signals in the first exemplary embodiment. Here, FIG. 11A illustrates output timing of print data by the module A, FIG. 11B shows variations in a count value corresponding to cyan (C), FIG. 11C shows variations in a count value corresponding to magenta (M), FIG. 11D shows variations in a count value corresponding to yellow (Y), and FIG. 11E shows variations in a count value corresponding to black (K). Moreover, FIG. 11F shows a processing operation of the module A, FIG. 11G shows a processing operation of the module B-0 and FIG. 11H shows a processing operation of the module B-1.

FIGS. 12A to 12D are diagrams illustrating usage conditions of buffer circuit 450 at the times T1, T2 and T3. Here, FIG. 12A shows usage conditions of the buffer circuit 450C, FIG. 12B shows usage conditions of the buffer circuit 450M, FIG. 12C shows usage conditions of the buffer circuit 450Y and FIG. 12D shows usage conditions of the buffer circuit 450K.

FIGS. 13A to 13D are diagrams illustrating usage conditions of the buffer circuit 450 at the times T4, T5 and T6. Here, FIG. 13A shows usage conditions of the buffer circuit 450C, FIG. 13B shows usage conditions of the buffer circuit 450M, FIG. 13C shows usage conditions of the buffer circuit 450Y and FIG. 13D shows usage conditions of the buffer circuit 450K.

In the examples shown in FIGS. 11A to 11H, the module A (the first circuit section 430, refer to FIG. 4) processes the four color signals in the order of line 1, line 2, line 3 and line 4 in parallel. Here, while the module A performs processing of the line 1, the count values representing the usage conditions of the buffer circuits 450 corresponding to the respective colors are 0.

In the case of FIGS. 11A to 11H, the time T1 indicates a point in time halfway through the signal processing of line 1 by the module A. At this point in time, since the write (WR) completion signal of the color signal from the module A to the buffer circuit 450 is not outputted yet, each of the count values is still 0.

Note that, to the buffer circuits 450C, 450M, 450Y and 450K, writing operations of the corresponding color signals proceed in parallel. In FIGS. 12A to 12D, a state in which each color signal is written halfway through the storage region M1 having data capacity of one line is represented by shading.

In the case of FIGS. 11A to 11H, the time T2 corresponds to the point in time when the write (WR) completion notice for the color signals of four colors in line 1 is outputted and the count values are updated. At this timing, the count values in the respective DMACs 433 corresponding to cyan (C), magenta (M), yellow (Y) and black (K) are updated to 1. Since writing has been completed, in FIGS. 12A to 12D, all regions in the storage region M1 are represented in shading.

In the exemplary embodiment, from the time T2, reading of the color signal corresponding to cyan (C) from the buffer circuit 450C by the module B-0 and reading of the color signal corresponding to yellow (Y) from the buffer circuit 450Y by the module B-1 are started in parallel. This is because each of the module B-0 and the module B-1 can processes the color signal by only one color.

In the case of FIGS. 11A to 11H, the time T3 corresponds to the point in time immediately after writing of the color signal of four colors in line 2 is started. At this time, in the modules B-0 and B-1, processing of the color signal corresponding to cyan (C) read from the buffer circuit 450C and processing of the color signal corresponding to yellow (Y) read from the buffer circuit 450Y have been started. In FIG. 12, of the buffer circuits 450C and 450Y, portions of the storage regions M1 in which the color signals have been read are represented in white. On the other hand, since writing of the color signals of four colors corresponding to line 2 is started, part of the storage regions M2 in the four buffer circuits 450C, 450M, 450Y and 450K is represented in shading.

In the case of FIGS. 11A to 11H, the time T4 corresponds to the point in time when the read (RD) completion notice for the two colors of cyan (C) and yellow (Y), for which the reading started earlier, is outputted. By the notice, the count values of cyan (C) and yellow (Y) are updated from 1 to 0. In FIGS. 13A to 13D, all portions of the storage regions M1 of the buffer circuits 450C and 450Y corresponding to cyan (C) and yellow (Y) are changed to white.

At this point in time, since reading of magenta (M) and black (K) has not been started yet, the count values of magenta (M) and black (K) remain 1. The usage condition of the storage regions M1 and M2 at this point in time is shown in FIGS. 13A to 13D. In the buffer circuits 450M and 450K corresponding to magenta (M) and black (K), all the color signals of line 1 and part of the color signals of line 2 are stored in the storage region M1 and the storage region M2. Therefore, all regions of the storage region M1 and the top side of the storage region M2 are represented in shading.

As can be seen from the time T2 to the time T4, the time required for the second circuit section 440 to read the print data of one color from the buffer circuit 450 is shorter than the time required for the first circuit section 430 to write the print data of one color to the buffer circuit 450. To put it another way, the reading speed of the second circuit section 440 is faster than the writing speed of the first circuit section 430.

The ratio of the speed is determined based on the ratio between the number of processable color signals by the first circuit section 430 at a time (namely, four) and the number of processable color signals by the second circuit section 440 at a time (namely, two) (therefore, the ratio is two). Ideally, it is preferable that the ratio is two, but it is unnecessary to be exactly two. Note that, when the speed ratio is approximate to two as much as possible, the standby time in data transfer is reduced.

In the case of FIGS. 11A to 11H, the time T5 corresponds to the point in time when the write (WR) completion notice for the color signals corresponding to line 2 is outputted. By the notice, the count values of magenta (M) and black (K) are updated from 1 to 2, and the count values of cyan (C) and yellow (Y) are updated from 0 to 1.

At this time, the CMD management section 435 (refer to FIG. 6) detects that the count values of magenta (M) and black (K) become 2, and temporarily waits to start the processing of line 3 (that is, start of writing the color signals corresponding to line 3).

At the time T5 in FIGS. 13A to 13D, since the data is written in the storage region M2 of all four colors, all of the regions are shaded.

In the case of FIGS. 11A to 11H, the time T6 corresponds to the point in time when the read (RD) completion notices for the two colors of magenta (M) and black (K) are outputted. By the notice, the count values of magenta (M) and black (K) are updated from 2 to 1. In FIGS. 13A to 13D, at the point in time T6, all portions of the storage regions M1 of the buffer circuits 450C, 450M, 450Y, and 450K are changed to white.

At this point in time, the CMD management section 435 (refer to FIG. 6) detects that all the count values become 0 or 1, to thereby permit to start processing of line 3.

Effect of First Exemplary Embodiment

In the first exemplary embodiment, whereas the first circuit section 430 (refer to FIG. 4) on the early stage side can process four color signals at a time, even when the second circuit section 440 (refer to FIG. 4) on the later stage can process two color signals at a time, by devising the timing of writing and reading the color signals to and from the buffer circuit 450 (refer to FIG. 4), it is possible to transfer the color signals outputted from the first circuit section 430 to the second circuit section 440 directly without the bus 421 (refer to FIG. 4).

As a result, as compared to the transfer system including the bus 421 and the RAM 413 (refer to FIG. 4), the transfer speed of data from the first circuit section 430 to the second circuit section 440 can be increased. Moreover, since the reading speed from the buffer circuit 450 by the second circuit section 440 is faster than the writing speed to the buffer circuit 450 by the first circuit section 430, it is possible to prevent the waiting time from occurring in the processing operation in the second circuit section 440.

Moreover, the four color signals constituting the print data not only have a large data size, but also have characteristics to require processing operation in a real time; however, by use of the method by the exemplary embodiment, it is possible to reduce the amount of data to be read and written via the bus 421. In other words, bus occupancy can be reduced, and thereby performance of the image processing section 414 as a whole can be increased.

Particularly, since the print data has a large data size and requires real-time performance for signal processing, there is a significant effect by adopting the partial circuit 414A according to the exemplary embodiment.

Second Exemplary Embodiment

Here, description will be given of another configuration example of the partial circuit 414A constituting a part of the image processing section 414 (refer to FIG. 3).

In the partial circuit 414A in the first exemplary embodiment, the second circuit section 440 (refer to FIG. 4) positioned at the later stage is configured with two modules; however, in the exemplary embodiment, description will be given of a case in which the second circuit section 440 (refer to FIG. 4) positioned at the later stage is configured with a single module.

In the exemplary embodiment, only the configuration of the second circuit section 440 and the contents of the processing operation are different from those in the first exemplary embodiment. To put it another way, components other than the second circuit section 440 are similar to those in the first exemplary embodiment.

Figure 14:
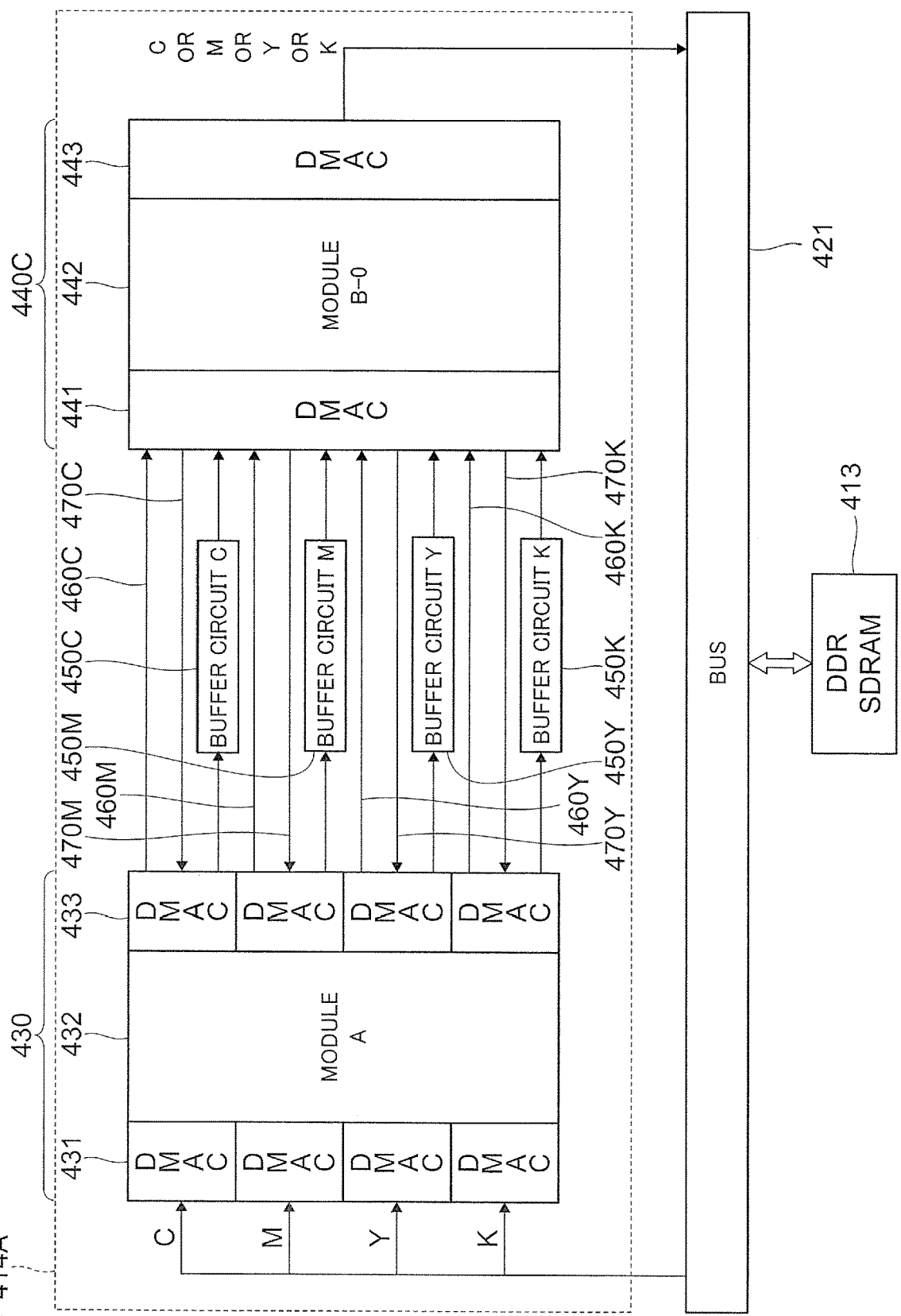
FIG. 14 is a diagram illustrating a configuration example of a partial circuit constituting a part of an image processing section in the second exemplary embodiment.

FIG. 14 is a diagram illustrating a configuration example of the partial circuit 414A constituting a part of the image processing section 414 (refer to FIG. 3) in the second exemplary embodiment. FIG. 14 is provided with reference signs same as those of the corresponding components in FIG. 4.

The second circuit section 440C in the exemplary embodiment is configured with only a single module B. In other words, there are the single DMAC 441 of the input side, the single module section 442 and the single DMAC 443 of the output side.

The DMAC 441 of the input side in the exemplary embodiment is different from the first exemplary embodiment in the point that the color signals are read from the buffer circuits 450C, 450M, 450Y and 450K in order in a line unit and the read (RD) completion notice corresponding to each color signal is outputted to the DMAC 433 of the output side of the first circuit section 430.

Moreover, the module section 442 in the exemplary embodiment is different from the first exemplary embodiment in the point that the signal processing predetermined in a line unit is performed for each color signal.

Moreover, the DMAC 443 of the output side in the exemplary embodiment writes the color signals of four lines having been subjected to predetermined processing to the RAM 413 via the bus 421 in the order of completion of processing.

FIGS. 15A and 15B are time sequence charts illustrating an example of a processing operation in the first circuit section 430 and a processing operation in the second circuit section 440C in the second exemplary embodiment. Here, FIG. 15A shows a processing operation of the first circuit section 430 (module A) and FIG. 15B shows a processing operation of the second circuit section 440C (module B).

FIGS. 15A and 15B are provided with reference signs same as those of the corresponding components in FIGS. 5A to 5C.

The horizontal axis in FIGS. 15A and 15B represents time.

Note that, to illustrate the processing performed in the first circuit section 430 and the second circuit section 440C, the time sequence charts shown in FIGS. 15A and 15B show only a part of processing actually performed.

The first circuit section 430 shown in FIGS. 15A and 15B processes the print data corresponding to the four colors of cyan (C), magenta (M), yellow (Y) and black (K) in parallel within a period T. In the figure, processing is performed during a period in which the waveform is rising, and the processed print data is transferred to a next stage during a period in which the waveform is falling.

The second circuit section 440C processes the four kinds of print data corresponding to the four colors of cyan (C), magenta (M), yellow (Y) and black (K) sequentially in time series within the period T. In the figure, processing is performed during a period in which the waveform is rising, and the processed print data is transferred to a next stage during a period in which the waveform is falling. During the period of waveform falling disposed between the respective color signals, the color signal to be processed in the module section 442 is switched.

As shown in FIGS. 15A and 15B, while the first circuit section 430 processes the print data of one color (during the period T), the second circuit section 440C processes the print data of four colors. In other words, the time used by the second circuit section 440C to process the print data of one color is less than a quarter of the time used by the first circuit section 430 to process the print data of one color. To put it another way, the processing speed of the second circuit section 440C is more than four times the processing speed of the first circuit section 430.

The four times the value is determined based on the ratio between the number of processable color signals by the first circuit section 430 at a time (namely, four) and the number of processable color signals by the second circuit section 440C at a time (namely, one) (therefore, the ratio is 4). However, though the value is not necessarily four times in an exact way, when the value is approximated to four times as much as possible, the standby time in data transfer is reduced.

Hereinafter, by use of FIGS. 16A to 16G to FIGS. 18A to 18D, description will be given of details of reading and writing data performed between the first circuit section 430 and the second circuit section 440C.

FIGS. 16A to 16G are examples of a time sequence chart illustrating progress in processing operations and variations in count values corresponding to the respective color signals in the second exemplary embodiment. Here, FIG. 16A illustrates output timing of print data by the module A, FIG. 16B shows variations in a count value corresponding to cyan (C), FIG. 16C shows variations in a count value corresponding to magenta (M), FIG. 16D shows variations in a count value corresponding to yellow (Y), and FIG. 16E shows variations in a count value corresponding to black (K). Moreover, FIG. 16F shows a processing operation of the module A, and FIG. 16G shows a processing operation of the module B.

FIGS. 17A to 17D are diagrams illustrating usage conditions of buffer circuit 450 at the times T1, T2 and T3. Here, FIG. 17A shows usage conditions of the buffer circuit 450C, FIG. 17B shows usage conditions of the buffer circuit 450M, FIG. 17C shows usage conditions of the buffer circuit 450Y, and FIG. 17D shows usage conditions of the buffer circuit 450K.

FIGS. 18A to 18D is a diagram illustrating usage conditions of the buffer circuit 450 at the times T4 and T5. Here, FIG. 18A shows usage conditions of the buffer circuit 450C, FIG. 18B shows usage conditions of the buffer circuit 450M, FIG. 18C shows usage conditions of the buffer circuit 450Y, and FIG. 18D shows usage conditions of the buffer circuit 450K.

In the examples shown in FIGS. 16A to 16G, the module A (the first circuit section 430, refer to FIG. 14) processes the four color signals in the order of line 1, line 2, line 3 and line 4 in parallel. Here, while the module A performs processing of the line 1, the count values representing the use conditions of the buffer circuits 450 corresponding to the respective colors are 0.

In the case of FIGS. 16A to 16G, the time T1 indicates a point in time halfway through the signal processing of line 1 by the module A. At this point in time, since the write (WR) completion signal of the color signal from the module A to the buffer circuit 450 is not outputted yet, each of the count values is still 0.

Note that, to the buffer circuits 450C, 450M, 450Y and 450K, writing operations of the corresponding color signals proceed in parallel. In FIGS. 17A to 17D, a state in which each color signal is written halfway through the storage region M1 having data capacity of one line is represented by shading.

In the case of FIGS. 16A to 16G, the time T2 corresponds to the point in time when the write (WR) completion notice for the color signals in line 1 is outputted and the count values are updated. At this timing, the count values in the respective DMACs 433 corresponding to cyan (C), magenta (M), yellow (Y) and black (K) are updated to 1. Since writing has been completed, in FIGS. 17A to 17D, all regions in the storage region M1 are represented in shading.

In the exemplary embodiment, from the time T2, reading of the color signal corresponding to cyan (C) from the buffer circuit 450C by the module B is started.

In the case of FIGS. 16A to 16G, the time T3 corresponds to the point in time after writing of the color signal of four colors in line 2 is started, and the read (RD) completion notice for cyan (C) is outputted. By the notice, only the count value of cyan (C) is updated from 1 to 0. In other words, the count values of magenta (M), yellow (Y) and black (K) remain 1.

Therefore, in FIGS. 17A to 17D, of the storage regions M1 of the four buffer circuits 450C, 450M, 450Y and 450K, only the storage region M1 of the buffer circuit 450C is represented in white. On the other hand, since writing of the color signals of four colors corresponding to line 2 is started, part of the storage regions M2 of the four buffer circuits 450C, 450M, 450Y and 450K is represented in shading.

In the case of FIGS. 16A to 16G, the time T4 corresponds to the point in time when the read (RD) completion notice for magenta (M) is outputted. By the notice, the count value of magenta (M) is newly updated from 1 to 0. At this point in time, since reading of yellow (Y) and black (K) has not been started yet, the count values of yellow (Y) and black (K) remain 1.

In FIGS. 18A to 18D, all portions of the storage region M1 of the buffer circuit 450M corresponding to magenta (M) are changed to white.

Note that, at the time T4, writing of the color signals corresponding to line 2 to the buffer circuits 450C, 450M, 450Y and 450K has not been completed.

In the case of FIGS. 16A to 16G, the time T5 corresponds to the point in time when the write (WR) completion notice for the color signals corresponding to line 2 is outputted. By the notice, the count values of cyan (C) and magenta (M) are updated from 0 to 1, and the count values of yellow (Y) and black (K) are updated from 1 to 2.

At this time, the CMD management section 435 (refer to FIG. 6) detects that the count values of yellow (Y) and black (K) become 2, and temporarily waits to start the processing of line 3 (that is, start of writing the color signals corresponding to line 3).

In FIGS. 18A to 18D, all regions in the storage regions M2 are represented in shading.

As shown in FIGS. 16A to 16G, hereinafter, when the read (RD) completion notice for yellow (Y), which is the third color, is outputted, the count value of yellow (Y) is varied from 2 to 1, and when the read (RD) completion notice for black (K), which is the fourth color, is outputted, the count value of black (K) is varied from 2 to 1.

In this manner, when all the count values of four colors become 1, processing of line 3 is started.

Note that, in the case of the exemplary embodiment, though the waiting time becomes longer than the case of the first exemplary embodiment due to a relationship of the reading speed to the writing speed (relationship of the processing speed of the second circuit section 440C), the waiting time can be reduced by increasing the reading speed (that is, the processing speed of the second circuit section 440C).

Effect of Second Exemplary Embodiment

Also, in the case of the second exemplary embodiment, similar to the first exemplary embodiment, it is possible to directly transfer the color signal outputted from the first circuit section 430 (refer to FIG. 14) to the second circuit section 440 (refer to FIG. 14) without the bus 421 (refer to FIG. 14).

Note that, in the case of the second exemplary embodiment, since the number of modules constituting the second circuit section 440 is smaller by one than that of the first exemplary embodiment, the circuit size of the partial circuit 414A can be reduced as compared to the first exemplary embodiment.

REFERENCE

Here, description will be given of how another module positioned at the later stage reads the respective print data items corresponding to cyan (C), magenta (M), yellow (Y) and black (K), which have been processed by the module B described in the first and second exemplary embodiments, from the RAM 413 (refer to FIG. 4).

Figure 19:
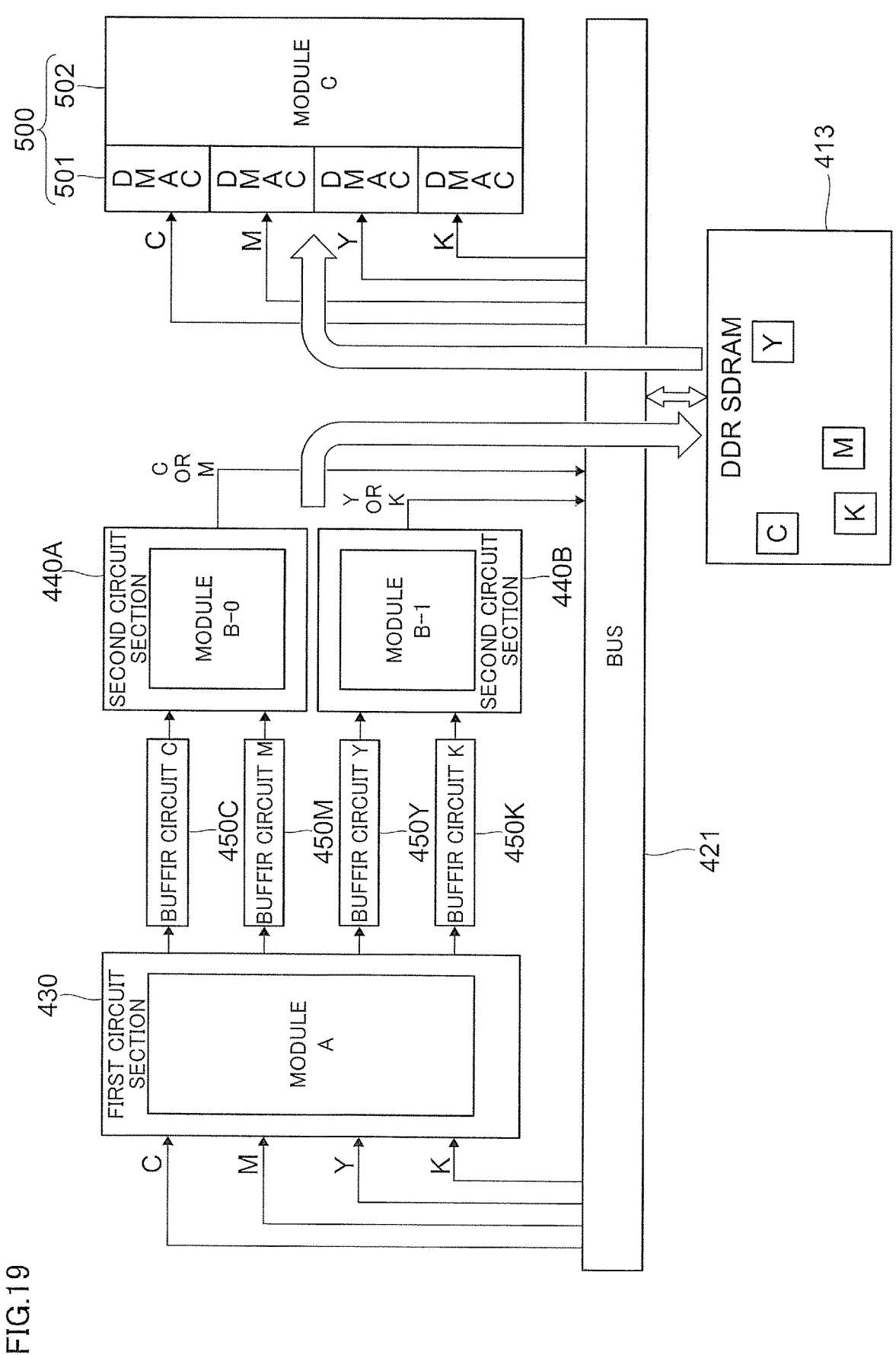
FIG. 19 is a diagram illustrating a processing operation by a module section (module C) that processes the processing results of the module B.

FIG. 19 is a diagram illustrating a processing operation by a module section 502 (module C) that processes the processing results of the module B. FIG. 19 is provided with reference signs same as those of the corresponding components in FIG. 4. In other words, FIG. 19 is premised on the circuit configuration of the first exemplary embodiment. Of course, similar operations are performed in the second exemplary embodiment.

A third circuit section 500 (module C) constitutes the partial circuit 414A together with the first circuit section 430 (module A), the buffer circuit 450 and the second circuit section 440.

As described above, the second circuit section 440A (module B-0) serially outputs the print data corresponding to cyan (C) or magenta (M). Moreover, the second circuit section 440B (module B-1) serially outputs the print data corresponding to yellow (Y) or black (K).

These print data items are stored in different regions in the RAM 413 by each color via the bus 421. In FIG. 19, the storage regions corresponding to the respective colors are represented as C, M, Y and K.

At the input stage of the third circuit section 500 is provided with DMACs 501 of the respective colors for directly reading the print data of the four colors from the RAM 413 without the CPU 411.

The four DMACs 501 disposed at the input stage of the third circuit section 500 read the print data corresponding to cyan (C), the print data corresponding to magenta (M), the print data corresponding to yellow (Y) and the print data corresponding to black (K) from the different regions of the RAM 413 little by little in parallel. However, at this point in time, pixel positions to which the print data of the four colors are corresponding are separated.

The four DMACs 501 cooperate to composite the print data of four colors in the separated state in a pixel (point) unit to be provided to the module section 502 (module C). In other words, after conversion operation from a plane into a point by the four DMACs 501, processing by the module section 502 (module C) is performed.

Other Exemplary Embodiments

The exemplary embodiments of the present invention have been described above, but the technical scope of the present invention is not limited to the scope of the above-described exemplary embodiments. For example, various modifications or improvements added to the above-described exemplary embodiments may be apparently included in the technical scope of the present invention from the description of the claims.

For example, in the image forming apparatus 1 (refer to FIG. 1) described in the first exemplary embodiment, the image reading device 100 and the image recording device 200 (including the controller 400) are integrated; however, the image reading device 100 and the image recording device 200 (refer to FIG. 1) may be contained in housings independent from each other.

Moreover, in the image forming apparatus 1 in the first exemplary embodiment, a device configuration for office use is assumed, but the image forming apparatus may be used for commercial purpose (used for production).

Moreover, in the first and second exemplary embodiments, cyan (C), magenta (M), yellow (Y) and black (K) are shown as the example of the color signals constituting the print data; however, the number of the color data items may be five or more.

Moreover, in the first and second exemplary embodiments, cyan (C), magenta (M), yellow (Y) and black (K) are shown as the example of the color signals constituting the print data; however, color signals defined by another color space (for example, Lab color space) may be adopted.

Moreover, in the first and second exemplary embodiments, description is given of the print data as an example of image data; however, for the signal processing of display data provided to the display 310, the systems in the first and second exemplary embodiments can be used. The display 310 here is an example of an output unit.

The display data, which is an example of the image data, is composed of, for example, three colors of red (R), green (G) and blue (B). Regarding the display data, also, the color space used in the image processing may be a space other than red (R), green (G) and blue (B) (for example, Lab color space).

The foregoing description of the present exemplary embodiments of the present invention has been provided for the purposes of illustration and description. It is not intended to be exhaustive or to limit the invention to the precise forms disclosed. Obviously, many modifications and variations will be apparent to practitioners skilled in the art. The present exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a first processing unit that processes a first number of a plurality of color signals in parallel at a time and outputs the first number of processed plurality of color signals in parallel;
    a first number of buffer circuits corresponding to the first number of processed plurality of color signals, each buffer circuit temporarily storing a respective one of the processed plurality of color signals outputted in parallel from the first processing unit; and
    at least two second processing units, each of which reads a different subset having a second number of the processed plurality of color signals from the buffer circuits for further processing, the second number being greater than one and smaller than the first number such that each second processing unit reads a different subset of the processed plurality of color signals, each subset having the second number of the color signals, each second processing unit further processing the read second number of the color signals in sequence at a time, wherein:

a reading speed of the second processing units to read one color signal from a respective buffer circuit is faster than a writing speed of the first processing unit to write the one color signal to the respective buffer circuit, with the proviso that a ratio of the reading speed to the writing speed is determined based on a ratio of the first number to the second number, the plurality of color signals each represent visibly different and distinct colors, which are processed in parallel by the first processing unit, and one subset having the second number of the plurality of color signals, after having been processed by the first processing unit, are subsequently processed in sequence by one of the at least two second processing units, while another subset having the second number of the plurality of color signals are processed in sequence by another of the at least two second processing units.

2. The information processing device according to claim 1, wherein
the first number is a number of processable color signals by the first processing unit at a time and the second number is a number of processable color signals by each second processing unit at a time.

3. The information processing device according to claim 1, wherein:
each of the at least two second processing units includes a controller, and
upon being notified by the first processing unit of completion of writing of the one color signal to the respective buffer circuit, the controller starts reading of the one color signal from the respective buffer circuit.

4. The information processing device according to claim 1, wherein
a processing speed in the at least two second processing units is faster than a processing speed in the first processing unit.

5. The information processing device according to claim 4, wherein
a ratio of the processing speed in the at least two second processing units to the processing speed in the first processing unit is set based on a ratio of the first number, which is a number of processable color signals by the first processing unit at a time, to the second number, which is a number of processable color signals by the second processing unit at a time.

6. The information processing device according to claim 1, wherein
the plurality of color signals are image data.

7. The information processing device according to claim 6, wherein
the image data is print data.

8. The information processing device according to claim 1, wherein
the first processing unit and the first number of the buffer circuits are respectively connected via a first bus that is different from a bus used to input the color signals to the first processing unit, and
the first number of the buffer circuits and the at least two second processing units are respectively connected via a second bus that is different from the bus used to output the color signals from the at least two second processing units after processing.

9. The information processing device according to claim 1, wherein:
upon being notified by the at least two second processing units of completion of reading of the processed plurality of color signals, which is assumed to be a unit of processing, from the buffer circuits, the first processing unit starts writing of another processed plurality of color signals, which is a next unit of processing, to the buffer circuits, and
upon being notified by the first processing unit of completion of writing of the another processed plurality of color signals, which is assumed to be a unit of processing, to the buffer circuits, the at least two second processing units start reading of the another processed plurality of color signals, which is a next unit of processing, from the buffer circuits.

10. The information processing device according to claim 9, wherein
each of the completion of reading and the completion of writing is notified for each processed color signal.

11. The information processing device according to claim 1, wherein
the first processing unit, the first number of the buffer circuits, and the at least two second processing units are formed on a single semiconductor substrate.

12. An image processing system comprising:
a first memory connected to a bus;
a first processing unit that processes a first number of a plurality of color signals, which are read from the first memory via the bus, in parallel at a time and outputs the first number of processed plurality of color signals in parallel;
a first number of buffer circuits corresponding to the first number of processed plurality of color signals, each buffer circuit being not connected to the bus and temporarily storing a respective one of the processed plurality of color signals outputted in parallel from the first processing unit;
at least two second processing units, each of which reads a different subset having a second number of the processed plurality of color signals from the buffer circuits for further processing, the second number being greater than one and smaller than the first number such that each second processing unit reads a different subset of the processed plurality of color signals, each subset having the second number of the color signals,
each second processing unit further processing the read second number of the color signals in sequence at a time and storing the further processed color signals in the first memory via the bus; and
an output unit that outputs an image signal corresponding to the further processed color signals read from the first memory via the bus, wherein:
a reading speed of the second processing units to read one color signal from a respective buffer circuit is faster than a writing speed of the first processing unit to write the one color signal to the respective buffer circuit, with the proviso that a ratio of the reading speed to the writing speed is determined based on a ratio of the first number to the second number,
the plurality of color signals each represent visibly different and distinct colors, which are processed in parallel by the first processing unit, and
one subset having the second number of the plurality of color signals, after having been processed by the first processing unit, are subsequently processed in sequence by one of the at least two second processing units, while another subset having the second number of the plurality of color signals are processed in sequence by another of the at least two second processing units.

13. The information processing device according to claim 1, wherein
the first processing unit reads the plurality of color signals for processing from a memory via a bus,
the second processing units write the plurality of color signals that are processed by the second processing units to the memory via the bus, and
data is transferred from the first processing unit to the second processing units without using the bus, the data including the plurality of color signals that are processed by the first processing unit and are not yet processed by the second processing units.

* * * * *